United States Patent
Moesslang et al.

(10) Patent No.: US 10,736,711 B2
(45) Date of Patent: Aug. 11, 2020

(54) DENTAL TREATMENT AND/OR EXAMINATION ASSEMBLY, DENTAL COUPLING UNIT, AND METHOD FOR FLUSHING THE LIQUID-CONDUCTING SYSTEM OF A DENTAL TREATMENT AND/OR EXAMINATION ASSEMBLY

(71) Applicant: KALTENBACH & VOIGT GMBH, Biberach (DE)

(72) Inventors: Hubert Moesslang, Oberdischingen (DE); Joerg Eberle, Blaustein (DE)

(73) Assignee: KALTENBACH & VOIGT GMBH, Biberach (DE)

( * ) Notice: Subject to any disclaimer, the term of this patent is extended or adjusted under 35 U.S.C. 154(b) by 0 days.

(21) Appl. No.: 16/312,722

(22) PCT Filed: Jun. 22, 2017

(86) PCT No.: PCT/EP2017/065422
§ 371 (c)(1),
(2) Date: Dec. 21, 2018

(87) PCT Pub. No.: WO2017/220731
PCT Pub. Date: Dec. 28, 2017

(65) Prior Publication Data
US 2019/0336244 A1    Nov. 7, 2019

(30) Foreign Application Priority Data
Jun. 22, 2016    (EP) .................................... 16175632

(51) Int. Cl.
*A61C 1/02* (2006.01)
*A61C 1/00* (2006.01)
(Continued)

(52) U.S. Cl.
CPC ........ *A61C 1/0061* (2013.01); *A61C 17/0202* (2013.01); *A61C 1/02* (2013.01); *A61C 19/002* (2013.01)

(58) Field of Classification Search
CPC . A61C 17/02; A61C 17/0202; A61C 17/0208; A61C 17/0214; A61C 1/0061; A61C 1/0076
See application file for complete search history.

(56) References Cited

U.S. PATENT DOCUMENTS 3,667,683 A * 6/1972 Gilbert ................. A61C 17/032
                                                  239/428.5
4,957,483 A * 9/1990 Gonser ................... A61C 1/18
                                                  251/149.7
(Continued)

FOREIGN PATENT DOCUMENTS

DE    19714466 A1    10/1998
EP    0323598 A2    7/1989
(Continued)

OTHER PUBLICATIONS

International Search Report and Written Opinion received in International Application No. PCT/EP201/065422, dated Sep. 26, 2017 (20 pages).

*Primary Examiner* — Ralph A Lewis
(74) *Attorney, Agent, or Firm* — Michael Best & Friedrich LLP

(57) ABSTRACT

The invention relates to a dental coupling unit (1), which can be detachably coupled to an instrument attachment (2) for dental treatment and/or examination at the front end (11) of the coupling unit and also can be connected to a supply unit (3) for providing supply media for the instrument attachment (2), wherein a media supply line (4) extends through the coupling unit (1) toward the instrument attachment (2) and wherein additionally a media return line (5) extends through (Continued)

the coupling unit (1), which media return line is connected to an end region of the media supply line (4) extending through the coupling unit (1), which end region faces the instrument attachment (2). The coupling unit (1) has a valve assembly (6), which conducts the liquid from the coupling unit (1) to the instrument attachment (2) when the instrument attachment (2) is attached and conducts the liquid to the media return line (5) and blocks the escape of the liquid at the front end (11) of the coupling unit (1) when the instrument attachment is not attached.

23 Claims, 16 Drawing Sheets

(51) Int. Cl.
    *A61C 17/02*     (2006.01)
    *A61C 19/00*     (2006.01)

(56) References Cited

U.S. PATENT DOCUMENTS

| | | | | |
|---|---|---|---|---|
| 5,560,548 A * | 10/1996 | Mueller | ............... | B05B 1/1663 |
| | | | | 239/442 |
| 7,213,616 B2 * | 5/2007 | Wuollet | ............... | F16K 11/044 |
| | | | | 137/625.48 |
| 9,188,265 B2 * | 11/2015 | Schmidt | ................ | A61C 1/18 |

FOREIGN PATENT DOCUMENTS

| | | |
|---|---|---|
| JP | S62 97548 A | 5/1987 |
| WO | 2016/102524 A1 | 6/2016 |

\* cited by examiner

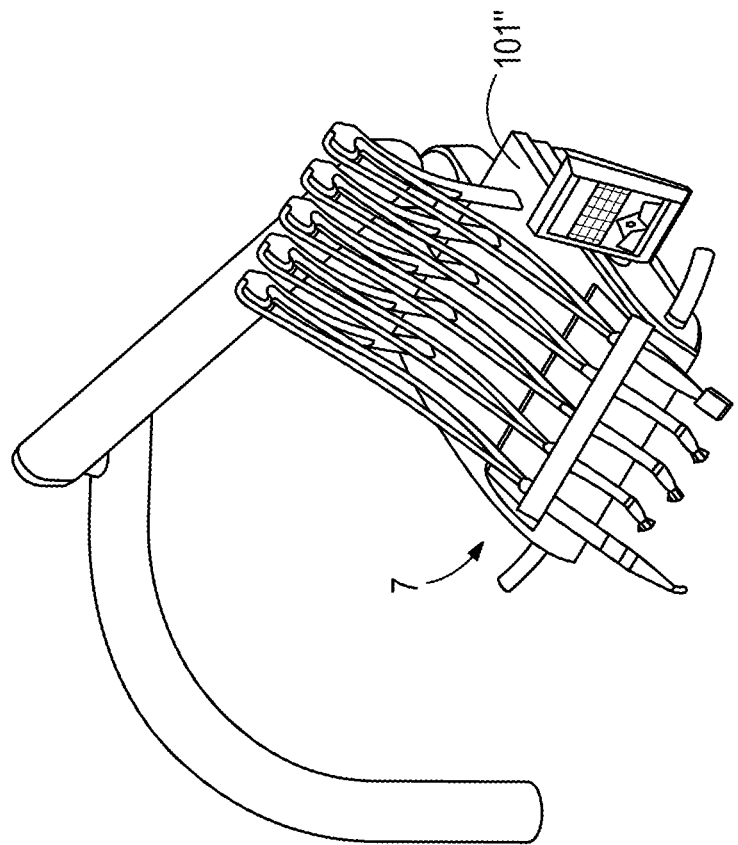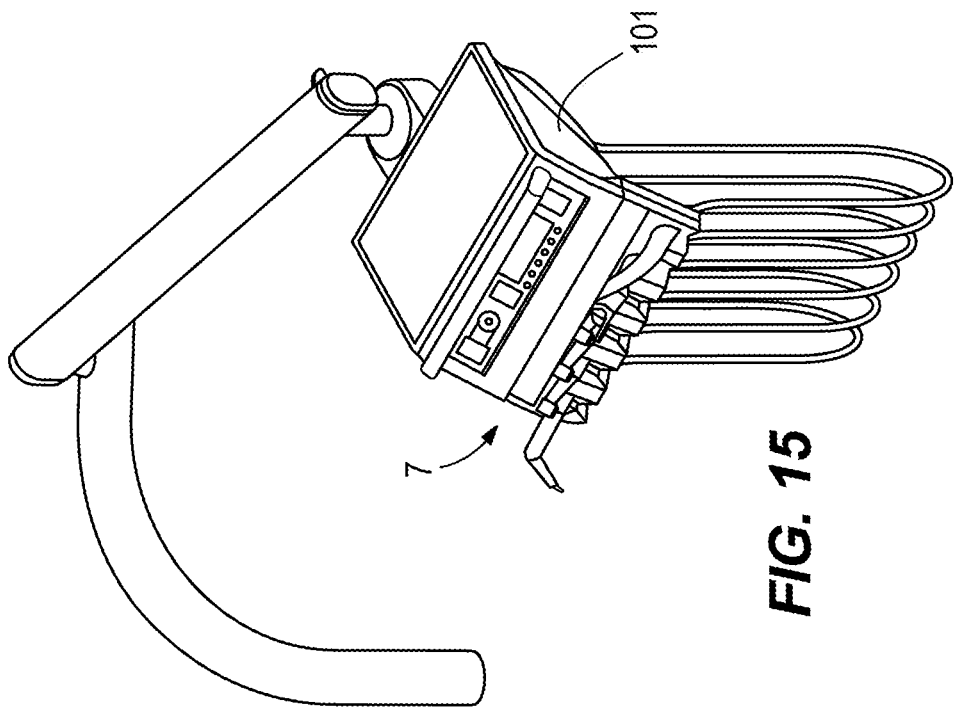

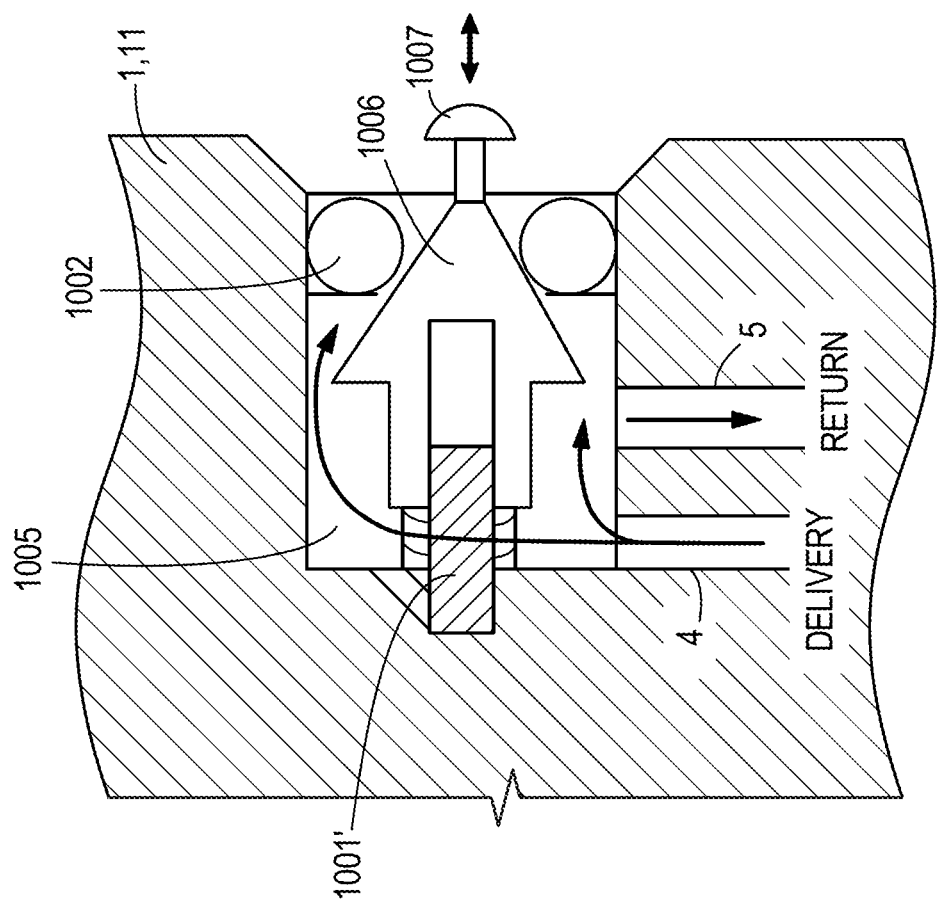
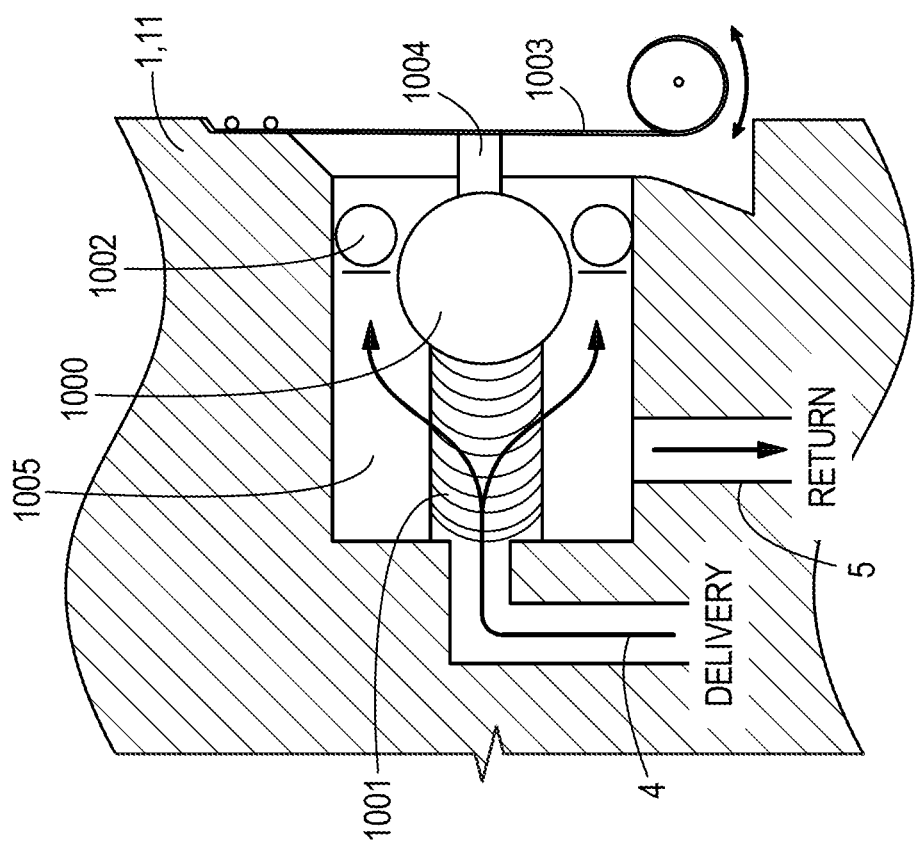

DENTAL TREATMENT AND/OR EXAMINATION ASSEMBLY, DENTAL COUPLING UNIT, AND METHOD FOR FLUSHING THE LIQUID-CONDUCTING SYSTEM OF A DENTAL TREATMENT AND/OR EXAMINATION ASSEMBLY

The invention relates to a dental treatment and/or examination assembly having a coupling unit which can be coupled at its front end to an instrument attachment and having a supply unit for providing supply media for the instrument attachment. Moreover, the invention encompasses a corresponding coupling unit and a method for flushing the liquid-conducting system of a corresponding treatment and/or examination assembly.

Figure 17:
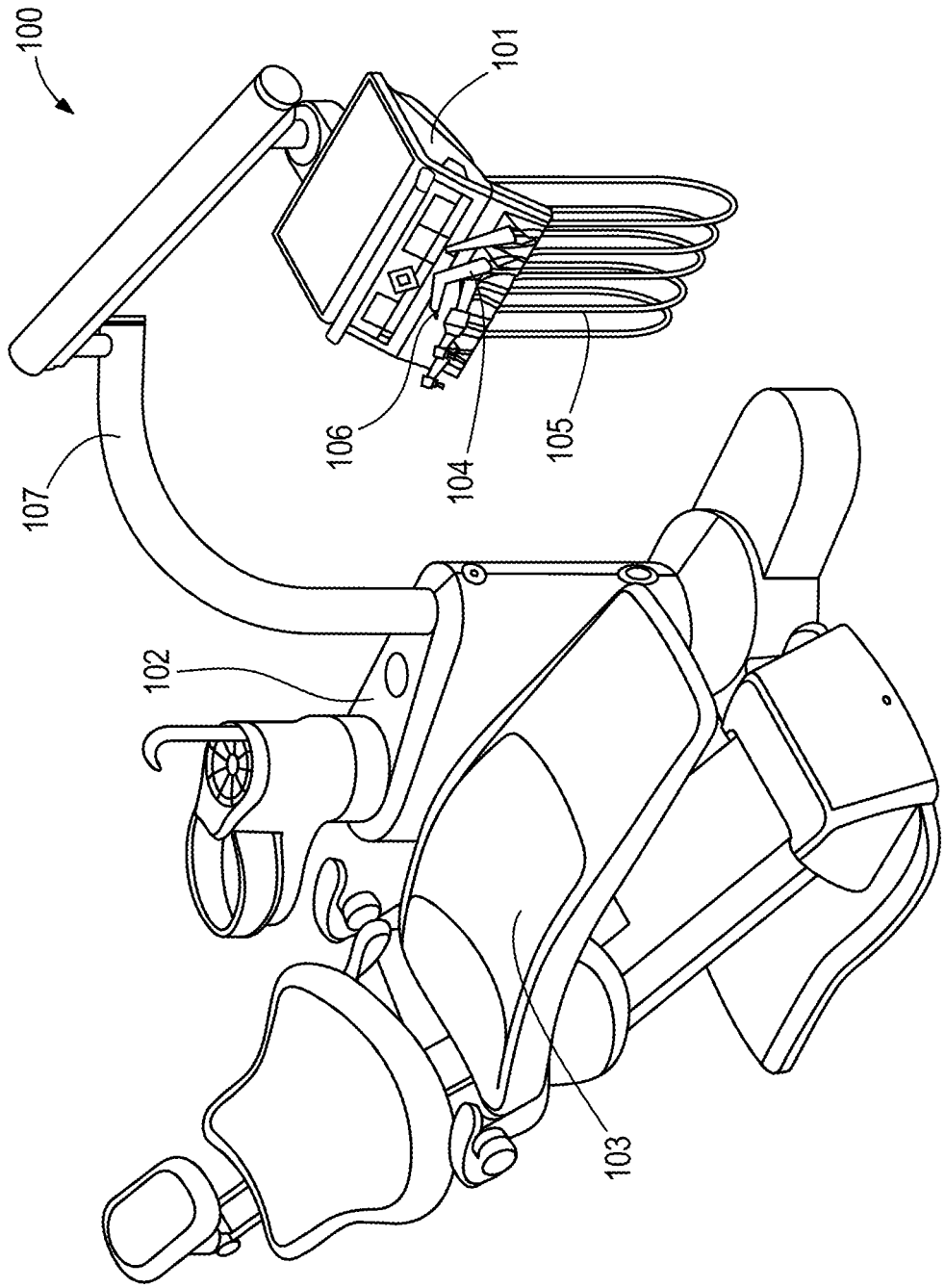

FIG. 17 shows a sketch of an example of a dental treatment unit 100 as an example of a dental treatment and/or examination assembly. Here, said treatment and/or examination assembly will also be referred to below as "assembly" for short. The assembly 100 comprises, inter alia, a so-called dentist's delivery unit 101, which is arranged in a swivel-mounted manner with respect to a base part 102 of the assembly 100, and also a patient chair 103.

The base part 102 can, in particular, be intended to be placed on a floor space of a room for operation of the assembly 100. Moreover, the assembly 100 preferably comprises a swivel-rod assembly 107, which is connected both to the base part 102 and to the dentist's delivery unit 101, with the dentist's delivery unit 101 being connected in a swivel-mounted manner to the base element 102 via the swivel-rod assembly 107.

The dentist's delivery unit 101 is used for the mounting of an instrument attachment 104, which can, for example, be a handpiece, a contra-angle handpiece, a turbine or a scaler. In a first approximation, the instrument attachment 104 is elongated, meaning 3o that it has a front end 106 and a rear end. At the same time, the instrument attachment 104 has a media line for an operating medium, or medium for short, for example a liquid, especially water. The media line of the instrument attachment 104 can, in particular, be outwardly open at the front end 106 of the instrument attachment 104, meaning that the medium in question can be dispensed to an appropriate task spot in the case of a task with the instrument attachment 104.

A supply unit is used for the provision of the medium, with a corresponding media delivery line being used to conduct the medium from the supply unit to the instrument attachment 104. The instrument attachment 104 is connected to a further element of the assembly 100, for example the dentist's delivery unit 101, via a flexible or deformable instrument or supply hose 105, with the media delivery line being arranged so as to extend through the supply hose 105 and, in particular, also along the or through the swivel-rod assembly 107. More generally, the instrument attachment 104 is used for dental treatment and/or examination.

To connect or couple the instrument attachment 104 to the supply hose 105, use is made of a coupling unit which has a rear end which is connected to the supply hose 105, for example in a reversibly releasable manner or else in a permanent or lasting manner. At its front end, the coupling unit has a coupling element which can be directly connected to the instrument attachment 104. In particular, the coupling element of the coupling unit can be a coupling pin, to which the instrument attachment 104 can be attached or fitted. In the connected or attached state, the instrument attachment 104 is connected to the coupling unit with operational readiness; in this state, the medium, i.e., the water for example, can flow such that it comes out of the media delivery line into the instrument attachment 104 or into the media line of the instrument attachment 104. At the same time, the media return line extends through the coupling unit toward the instrument attachment 104 or to the front end of the coupling unit.

Situated on the further element of the assembly that is connected to the supply hose 105, i.e., the dentist's delivery unit 101 for example, is a mount for holding the coupling unit, which mount is a type of holder for example. With the attached instrument attachment, the coupling unit can be removed from the mount and be moved away from the further element of the assembly or from the dentist's delivery unit 101, especially to a task spot, with the supply hose 105 deforming accordingly. After a task with the instrument attachment 104, the latter together with the coupling unit can be returned back to the mount.

After a treatment, the instrument attachment can be separated from the coupling unit, especially by withdrawal from the coupling pin. This separation of the instrument attachment 104 from the coupling unit after the task is usually carried out in a dental practice, for example after a patient has been treated.

The medium or the liquid, i.e., the water for example, is conducted through the media delivery line, i.e., generally during the task with the instrument attachment 104; the media delivery line is therefore part of a liquid-conducting or water-conducting system of the treatment unit 100.

Generally, one treatment unit has multiple corresponding coupling units and, accordingly, multiple supply hoses, with each of the coupling units being correspondingly connected to one of the supply hoses and all supply hoses being, on the other hand, connected to the further element of the assembly or to the dentist's delivery unit 101.

Figure 18:
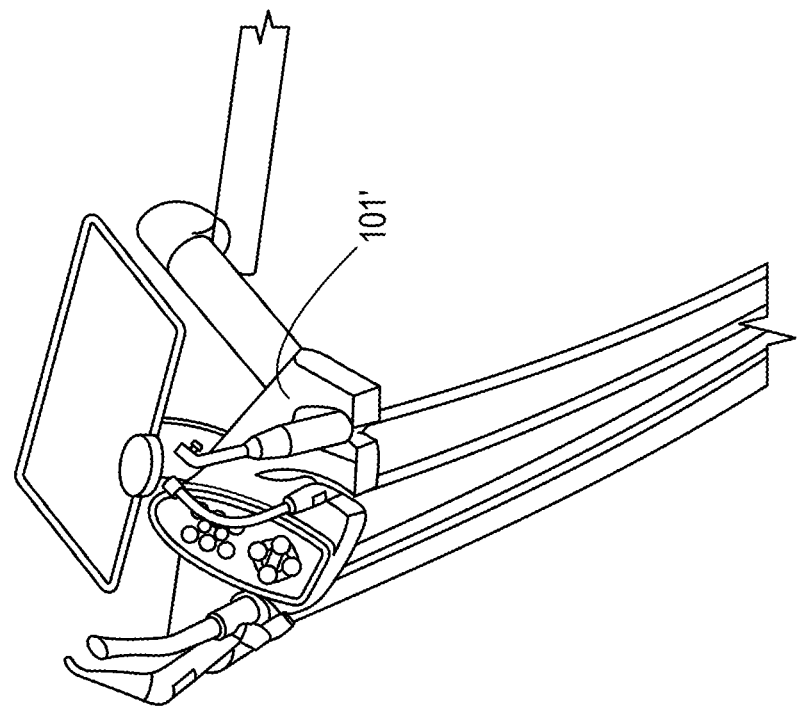

Alternatively—as sketched in FIG. 18—a so-called dental assistant's delivery unit 101' can be used instead of the dentist's delivery unit 101. Further alternatively, the dentist's delivery unit can—as sketched in FIG. 19—be configured as a cart version, i.e., not be connected to the base part 102 via a swivel-rod assembly 107 or the swivel-rod assembly 107. In the case of the cart version, the media delivery line naturally does not extend through the swivel-rod assembly.

In dentistry, there are various infection risks for patients and those involved in this field owing to the peculiarities of dental treatment. Therefore, a dental treatment and/or examination assembly has to meet appropriate hygiene requirements. This concerns, inter alia, the water-conducting or liquid-conducting system mentioned. In Germany, according to section 3 of the *Trinkwasserverordnung* (*TrinkwV*) [drinking-water regulation], only water which meets the requirements of this regulation may be fed into dental treatment units. However, even when this standard is observed, the water-conducting systems of dental treatment units are frequently colonized by various microorganisms.

Appropriate hygiene recommendations are, for example, found in the document "*Infektionspravention in der Zahnheilkunde—Anforderungen an die Hygiene; Mitteilung der Kommission für Krankenhaushygiene and Infektionspravention beim Robert Koch-Institut*" [prevention of infection in dentistry—hygiene requirements; communication from the commission for hospital hygiene and infection prevention at the Robert Koch Institute].

To ensure an appropriate microbiological water quality, a colony count of 100 per mL should not be exceeded. This is revealed by the last-mentioned document under point 5 "*Wasser fiihrende Systeme*" [water-conducting systems] in conjunction with section 3 of the *TrinkwV*. To ensure this, disinfection systems have to be installed in treatment units and the water-conducting systems have to be flushed every morning and also after each patient treatment.

To prevent microbial growth in the liquid-conducting system during a downtime, it is known to configure a treatment unit with a sterilization program. Said program is a semiautomated operation in which the supply hoses must be inserted into corresponding adapters. This insertion is carried out manually and therefore requires a correspondingly high level of time expenditure; moreover, access to the adapters is often restricted here. In addition, a corresponding flushing device requires considerable space. Documenting the flushing or sterilization that has been carried out is complicated and difficult, too; a complete verification for the purposes of quality management can be barely achieved here in practice.

EP 0 323 598 A2 discloses an apparatus for removing tartar and for lavage. The apparatus comprises a base unit, from which a line extends to a handpiece. Cooling water can be conducted through the line to the handpiece. The handpiece is, on the other hand, connected to an insert, in which a line which opens out forwardly is formed for a lavage substance.

DE 197 14 466 A1 discloses a dental motor having a stator and a rotor. Two cooling channels which extend spirally around the stator are used for cooling. At the front end, the two cooling channels are connected to one another via a diversion channel.

WO 2016/102524 A1, which is prior art under Article 54(3) EPC, shows a dental handpiece or contra-angle handpiece having a drive unit and a housing connectable thereto. The drive unit has a first fluid line and a second fluid line. Formed in the housing is a line which connects the two stated fluid lines of the drive unit to one another when the housing is, as intended, connected to the drive unit.

It is an object of the invention to provide a corresponding improved dental treatment and/or examination assembly; in this connection, the assembly is to be suitable for an easy-to-perform processing or flushing of the media delivery line of the assembly, especially in the case of an automatable procedure and an appropriate documentation option. Moreover, a coupling unit of a corresponding treatment and/or examination assembly that facilitates such processing is to be provided, as is an improved method for flushing the liquid-conducting system of a corresponding treatment and/or examination assembly.

This object is achieved according to the invention by the subject matter stated in the independent claims. Particular embodiments of the invention are specified in the dependent claims.

The invention provides a dental coupling unit which can be releasably coupled at its front end to an instrument attachment for dental treatment and/or examination and which can moreover be connected to a supply unit for providing supply media for the instrument attachment, wherein the supply media comprise at least one liquid. In this connection, a media delivery line for the liquid extends through the coupling unit toward the instrument attachment; additionally, a media return line extends through the coupling unit, which media return line is connected to an end region of the media delivery line extending through the coupling unit, said end region facing the instrument attachment. The coupling unit has a valve arrangement which conducts the liquid from the coupling unit to the instrument attachment when the instrument attachment is fitted and conducts the liquid to the media return line and blocks an escape of the liquid at the front end of the coupling unit when the instrument attachment is not fitted.

Preferably, the liquid is water, treated water or a medical or a chemical liquid.

The invention provides, in a further aspect, a dental treatment and/or examination assembly having a dental coupling unit according to the application. Moreover, the treatment and/or examination assembly has the supply unit, wherein the media delivery line extends from the supply unit through the coupling unit toward the instrument attachment. In this connection, the dental treatment and/or examination assembly moreover has means for selectively enabling a flow of the liquid through the media delivery line and the media return line, wherein these means for selective enabling comprise the valve arrangement.

Owing to the media return line, the media delivery line can be flushed with the liquid in a particularly appropriate manner, especially with a particularly low level of effort and, at the same time, in an appropriate manner for an automated procedure.

Since the coupling unit has the valve arrangement which blocks an escape of the liquid from the coupling unit at the front end when the instrument attachment is not fitted to the coupling unit, the assembly is particularly suitable for an automated procedure for the flushing operation.

Preferably, the means for selective enabling moreover comprise a valve, which is arranged in the region of the media return line. As a result, the means can be controlled in a particularly simple manner.

The invention provides, in a further aspect, a dental treatment and/or examination assembly having a dental coupling unit which can be releasably coupled at its front end to an instrument attachment for dental treatment and/or examination. Moreover, the assembly has a supply unit for providing supply media for the instrument attachment, wherein the supply media comprise at least one liquid, as well as a media delivery line for the liquid which extends from the supply unit through the coupling unit toward the instrument attachment. Moreover, the assembly has a media return line which can be connected to an end region of the media delivery line extending through the coupling unit, said end region facing the instrument attachment, wherein the dental treatment and/or examination assembly moreover has means for selectively enabling a flow of the liquid through the media delivery line and the media return line. Moreover, the assembly has a flushing adapter which can be coupled to the coupling unit when the instrument attachment is not fitted to the latter, wherein the media return line extends starting from the flushing adapter and, in the coupled state between flushing adapter and coupling unit, is connected to the media delivery line extending through the coupling unit. In this connection, the flushing adapter has seats for adapter inserts which are each designed for coupling to a coupling unit, wherein the adapter inserts can be freely positioned in the seats.

As a result, a particularly simple handling for the preparation for the flushing operation is made possible.

Preferably, in this connection, the flushing adapter is arranged on a dentist's or dental assistant's delivery unit of the treatment and/or examination assembly. Thus, the path of the coupling unit from its mount on the dentist's or dental assistant's delivery unit to the flushing adapter can be made particularly short.

Because the flushing adapter has seats for adapter inserts which are each designed for coupling to a coupling unit or to the coupling unit, wherein the adapter inserts can be freely positioned in the seats, a particularly advantageous spatial arrangement is made possible.

Preferably, the flushing adapter additionally has a feed line for a treatment agent, cleaning agent or disinfecting agent. This is, for example, particularly advantageous with regard to a treatment or disinfection of an O-ring of the coupling unit.

Preferably, the supply unit is designed to flush the media delivery line and the media return line with the liquid. This is advantageous with regard to the procedure in the flushing operation.

Preferably, the assembly is configured such that the supply unit dispenses the flushing liquid for a predefined period of time or dispenses a predefined quantity of the liquid. Thus, the flushing operation can be made particularly appropriately verifiable or documentable.

Preferably, the assembly is configured such that the supply unit monitors the quantity of the liquid dispensed for flushing. As a result, the flushing operation can, in particular, be made particularly reliable. This is, for example, advantageous with regard to quality assurance.

Preferably, the media return line extends as a pressure line as far as the supply unit or a disposal point. Thus, a particularly appropriate flushing of the media delivery line can be brought about.

Preferably, the assembly is configured such that the supply unit is capable of recognizing the type of fitted instrument or instrument attachment.

Preferably, the instrument attachment is a drill handpiece, a scaler or a dental spray handpiece.

Preferably, the dental treatment and/or examination assembly additionally has a supply hose via which the coupling unit is connected releasably or permanently to the supply unit, wherein the media delivery line and preferably also the media return line extend through the supply hose.

The invention provides, in a further aspect, a method for flushing the liquid-conducting system of a dental treatment and/or examination assembly, wherein the treatment and/or examination assembly has the following: a dental coupling unit which can be releasably coupled at its front end to an instrument attachment for dental treatment and/or examination, a supply unit for providing supply media for the instrument attachment, wherein the supply media comprise at least one liquid, and a media delivery line for the liquid, which extends from the supply unit through the coupling unit toward the instrument attachment.

The method has the steps of: a) conducting the liquid from the coupling unit to the instrument attachment when the instrument attachment is fitted to the coupling unit and b) flushing the liquid through the media delivery line and through a media return line connected to the latter when the instrument attachment is not fitted to the coupling unit.

Preferably, in this connection, the media return line extends particularly as a pressure line starting from a flushing adapter to which the coupling unit is connected in step b).

m Preferably, the method moreover has the following step c) of: opening a valve arrangement of the coupling unit by fitting the instrument attachment to the coupling unit, wherein the media delivery line is connected in a conducting manner to a media line of the instrument attachment when the valve arrangement is opened.

Preferably, the method moreover has the following step d) of: closing the valve arrangement by withdrawing the instrument attachment from the coupling unit, wherein an escape of the liquid at the front end of the coupling unit is blocked when the valve arrangement is closed.

Preferably, the method moreover has the following step e) of: applying an overpressure to the media delivery line, wherein preferably a check valve arranged in the media return line is opened by the applied overpressure.

Figure 1:
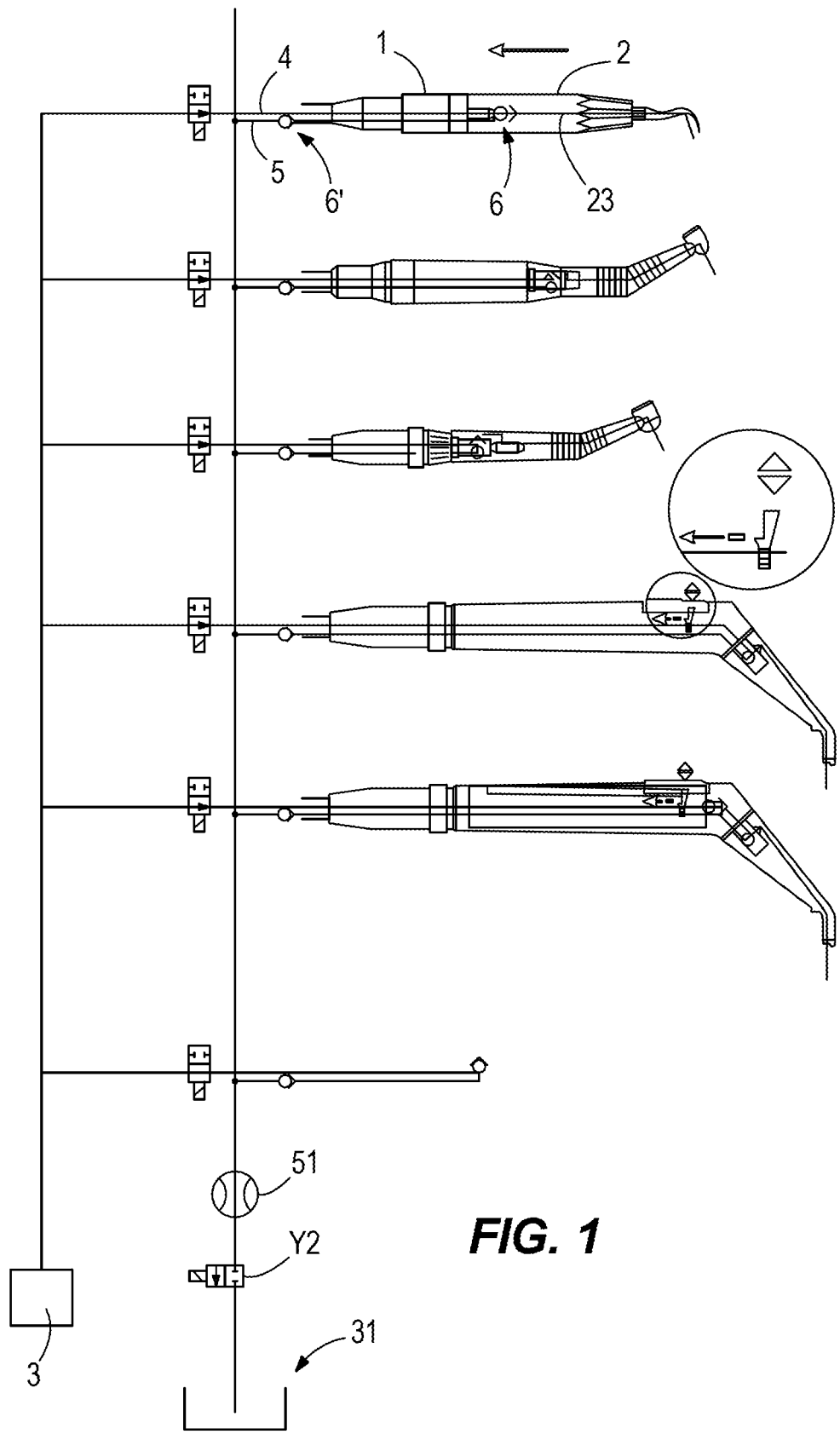
Figure 2:
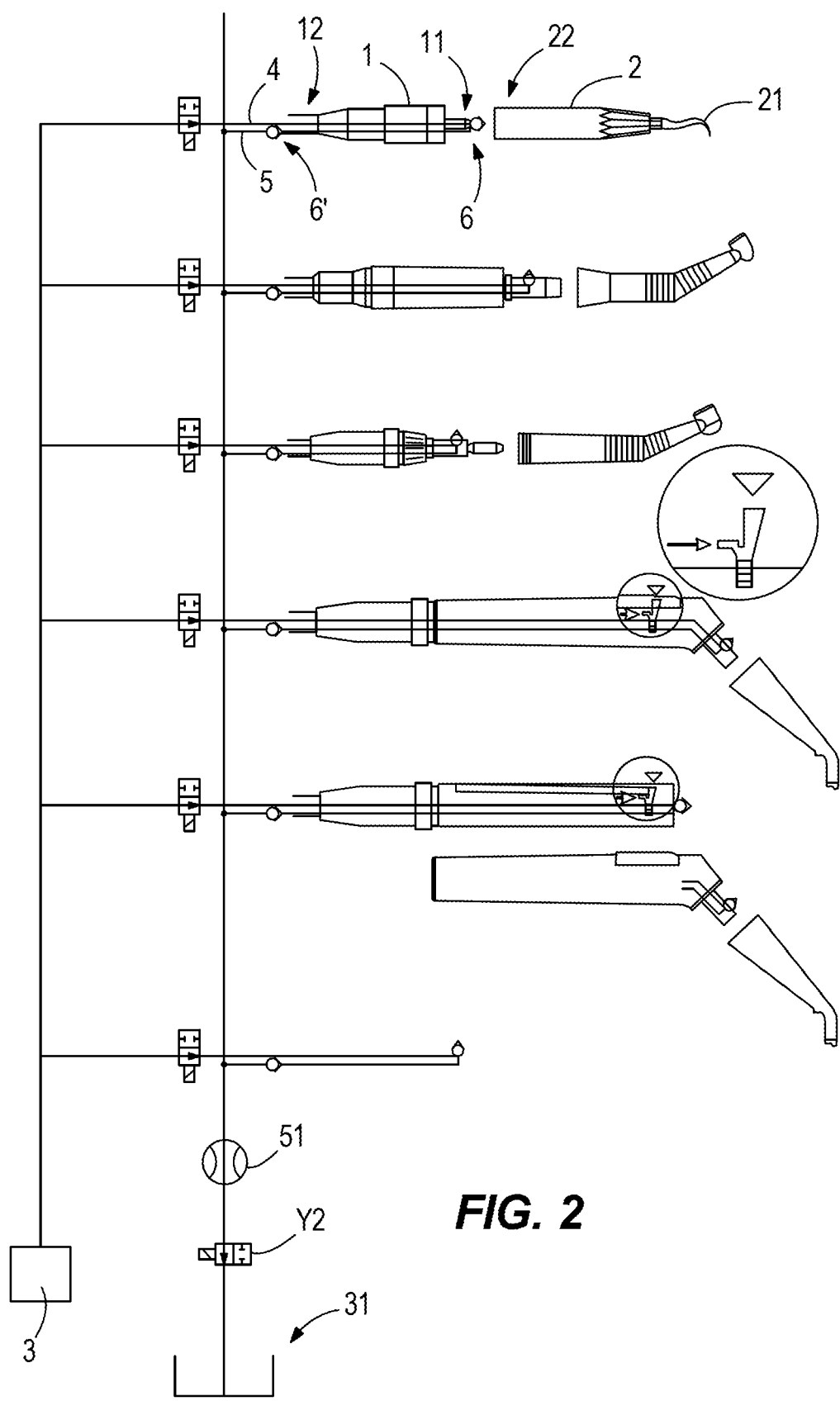
Figure 3:
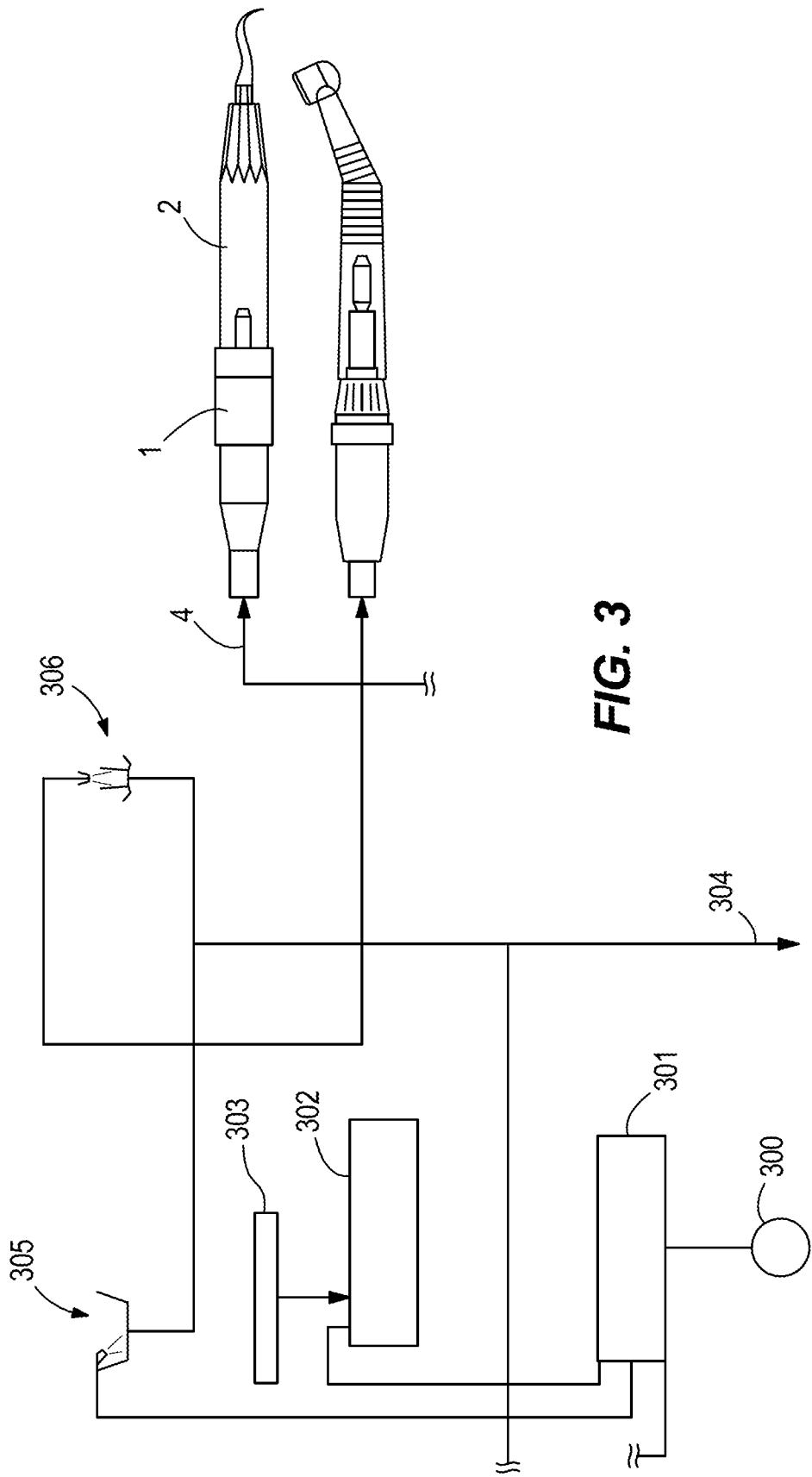
Figure 4:
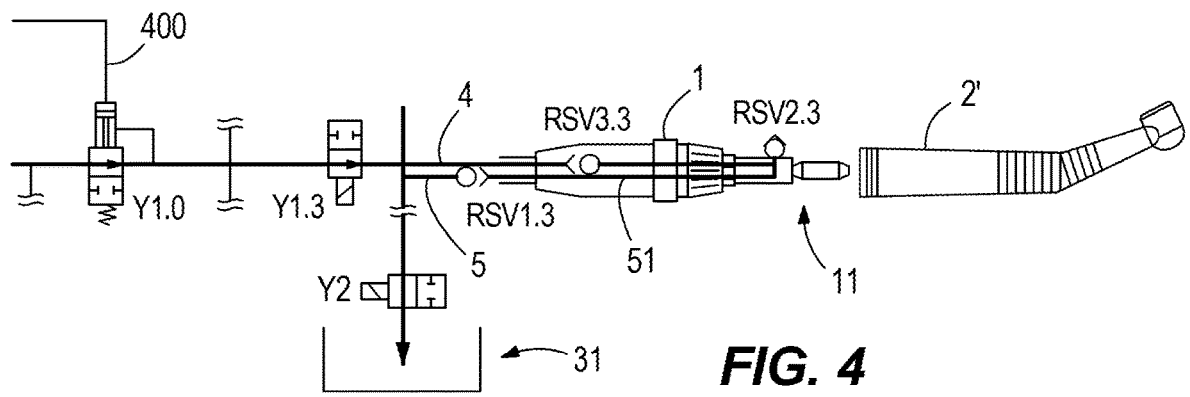
Figure 5:
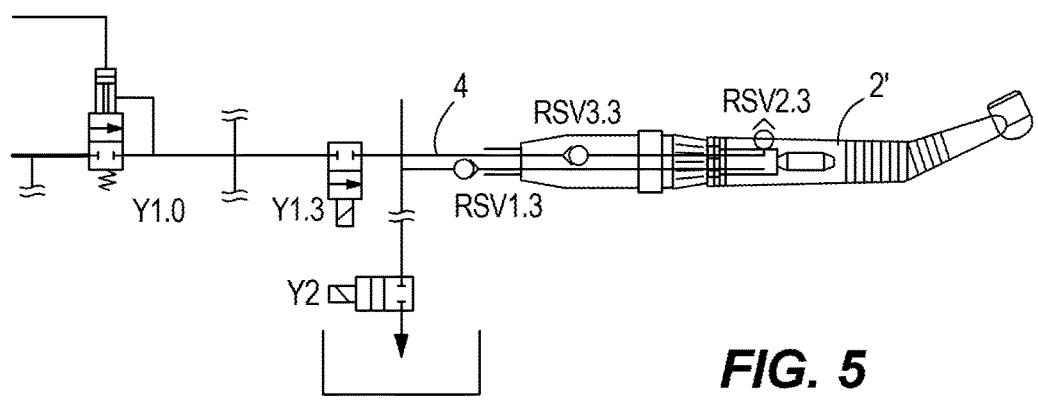
Figure 6:
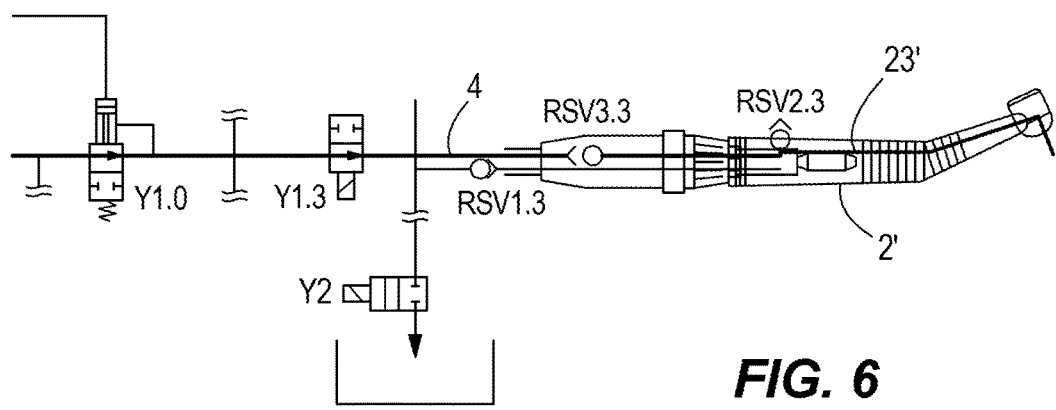
Figure 7:
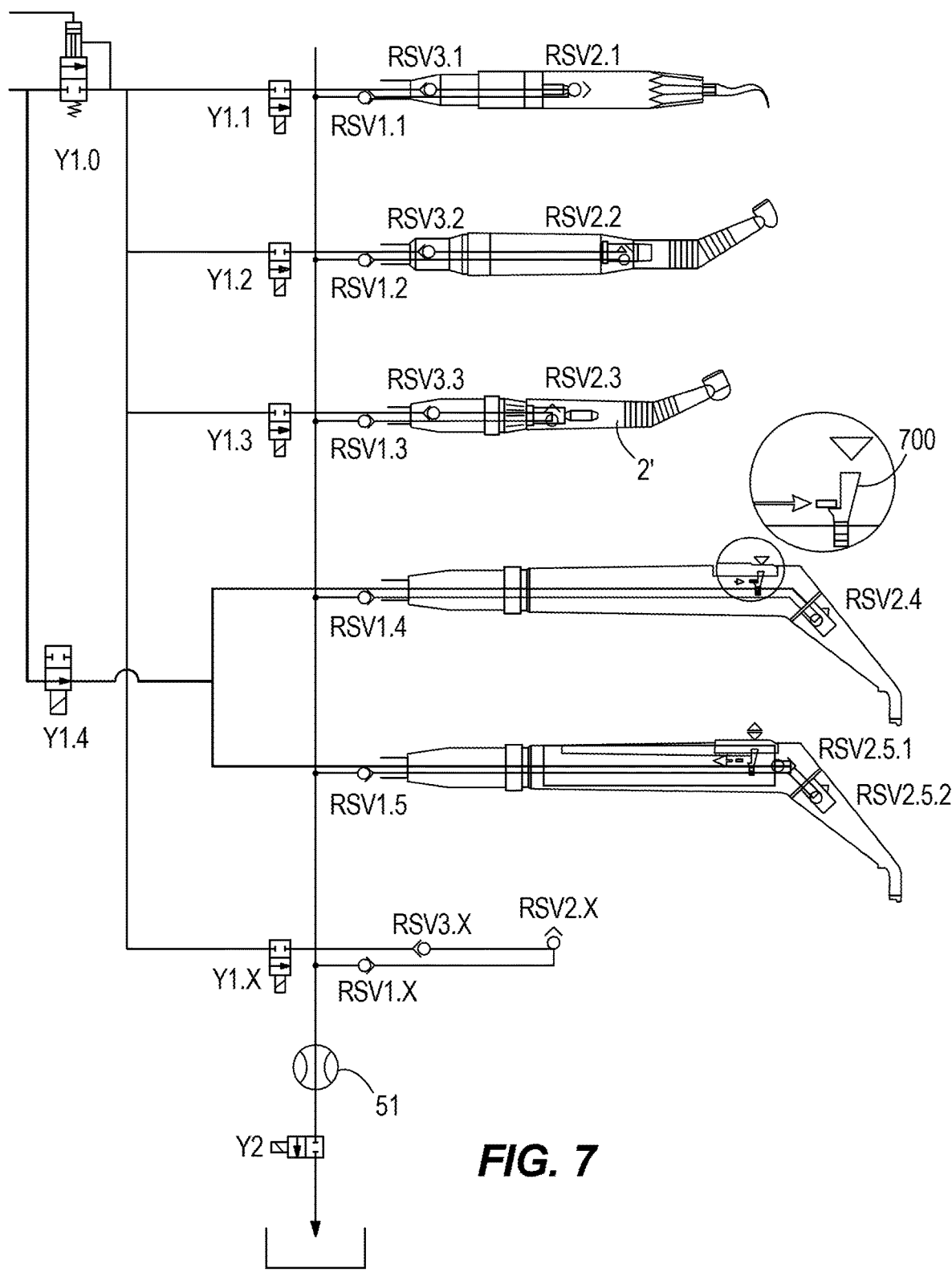
Figure 8:
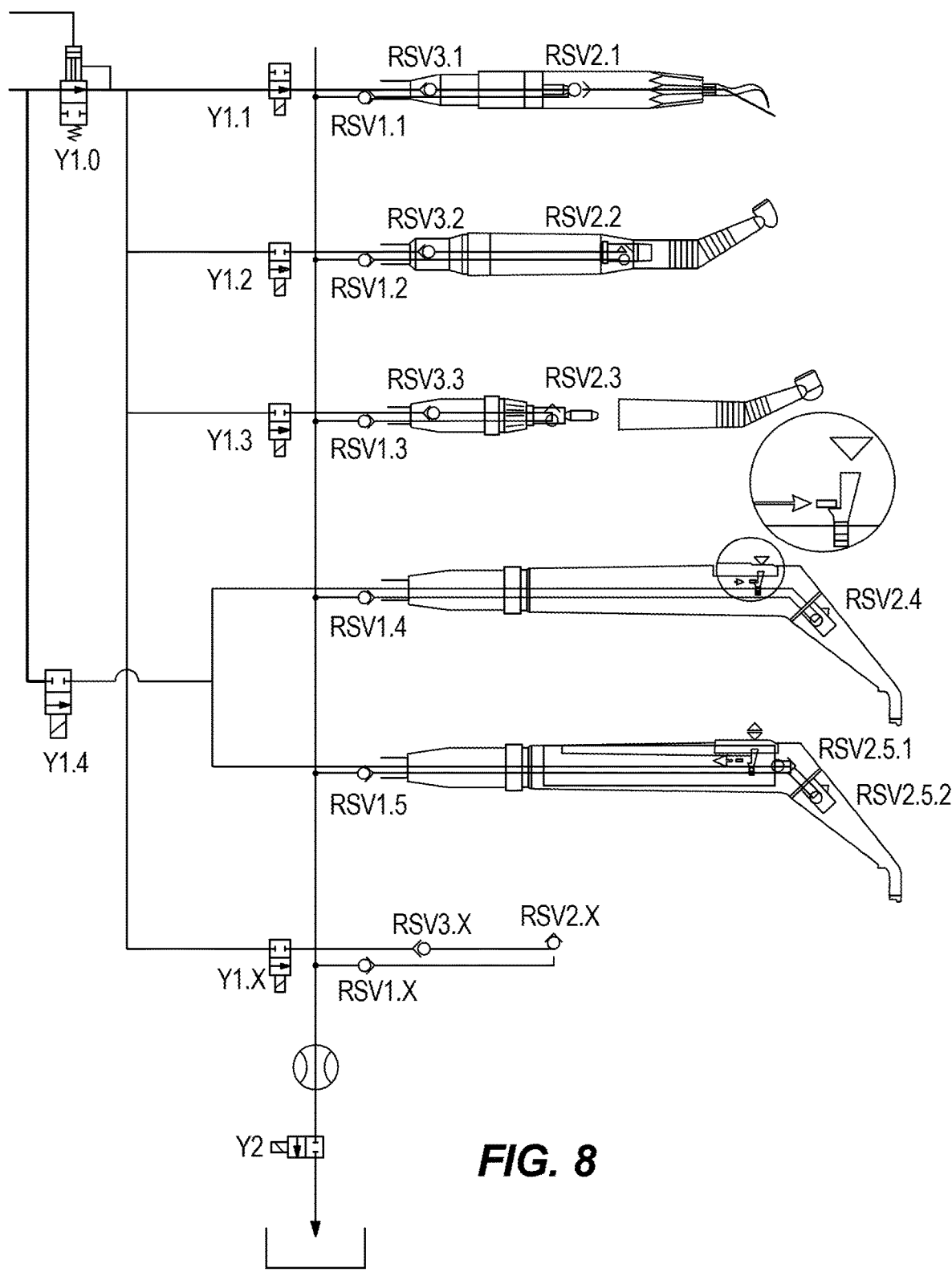
Figure 9:
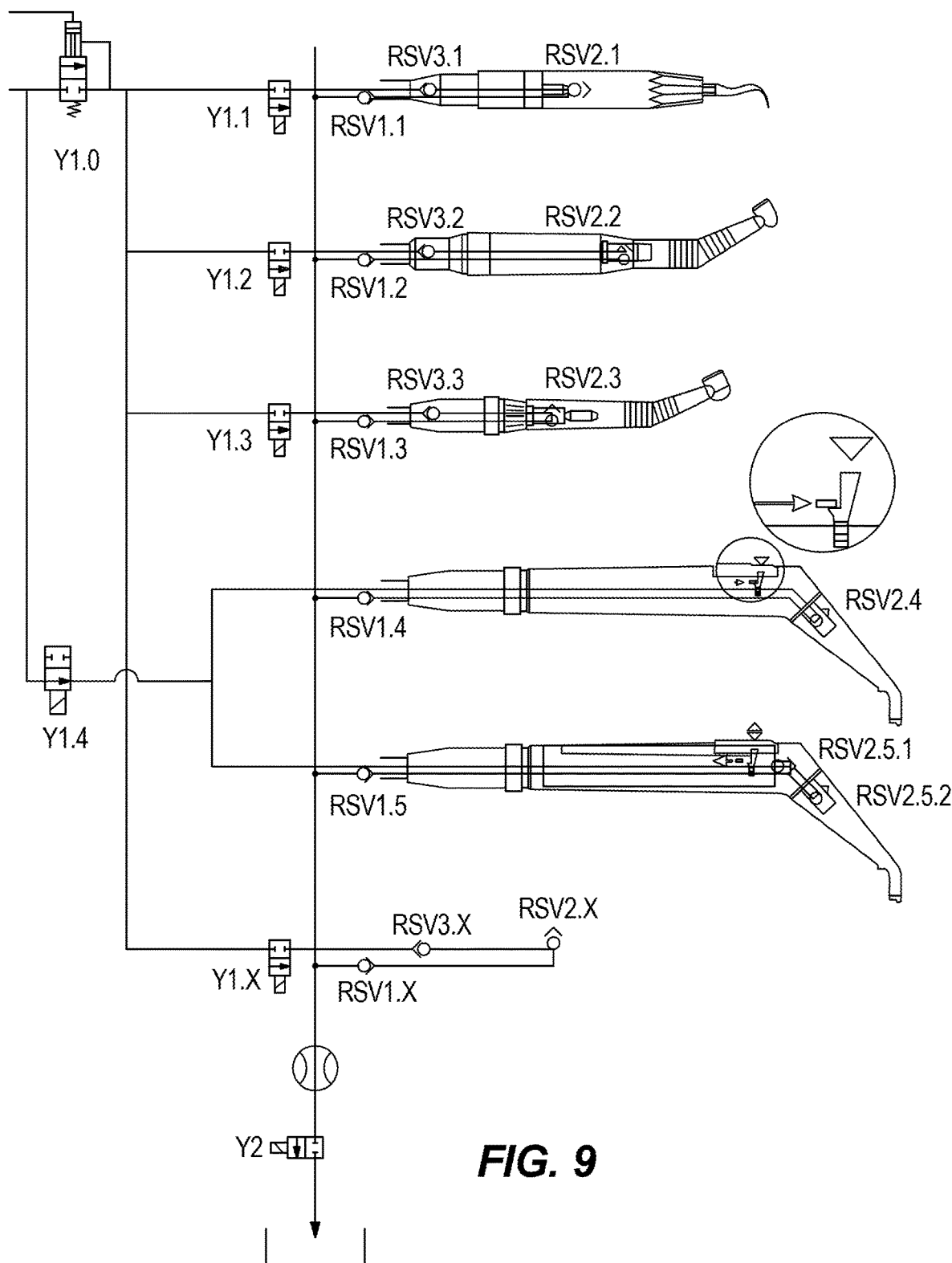
Figure 10:
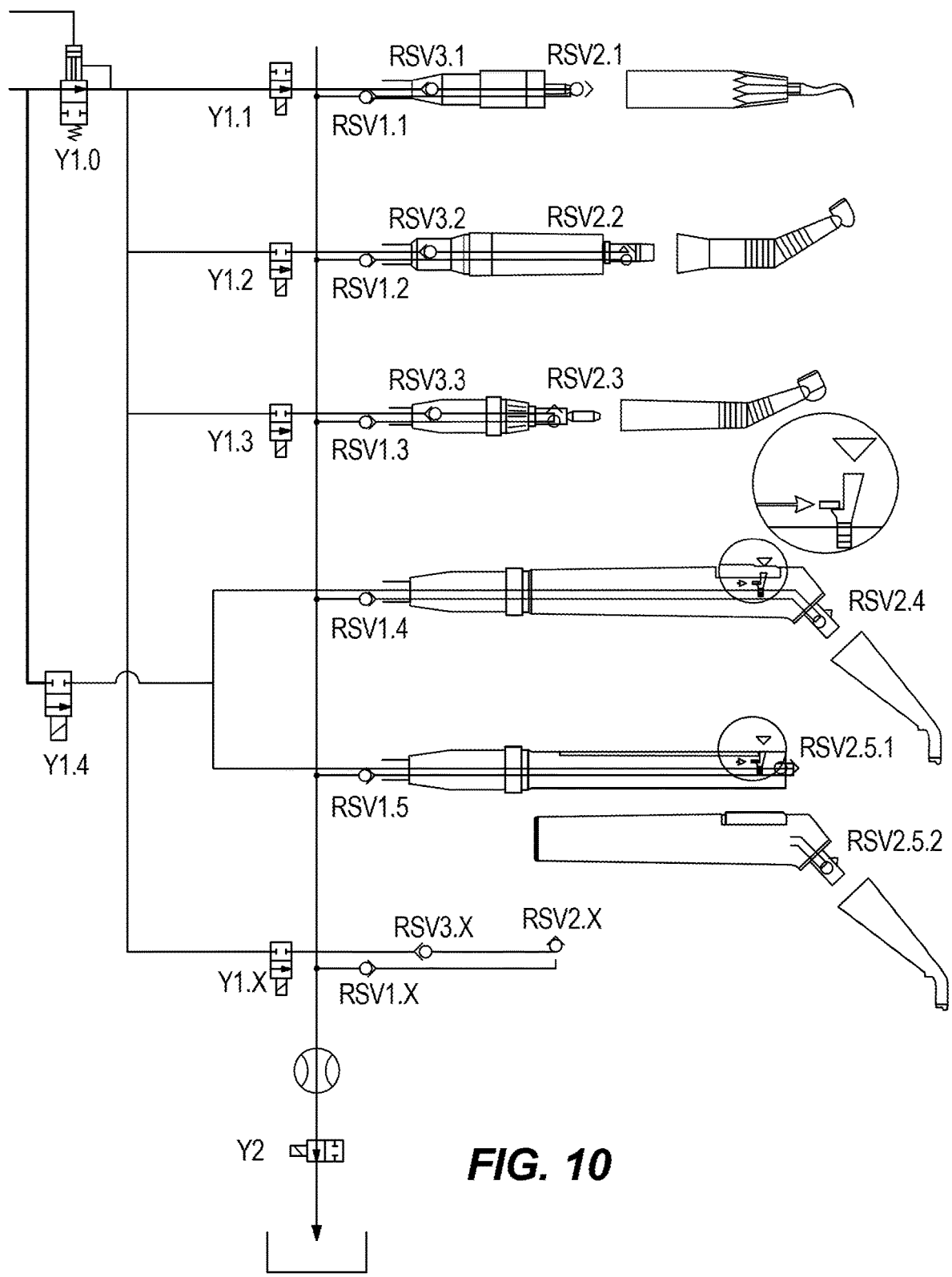
Figure 11:
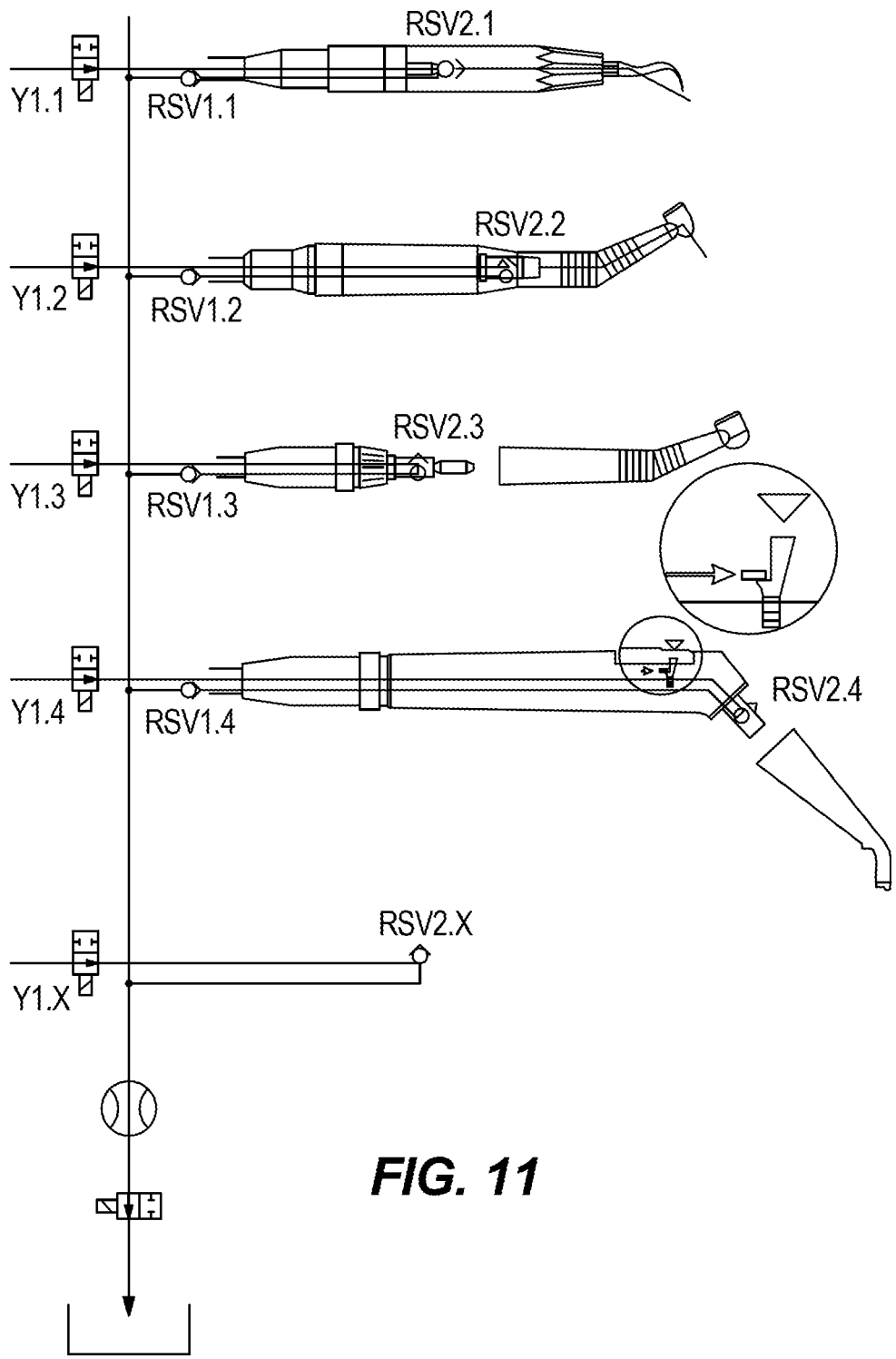
Figure 12:
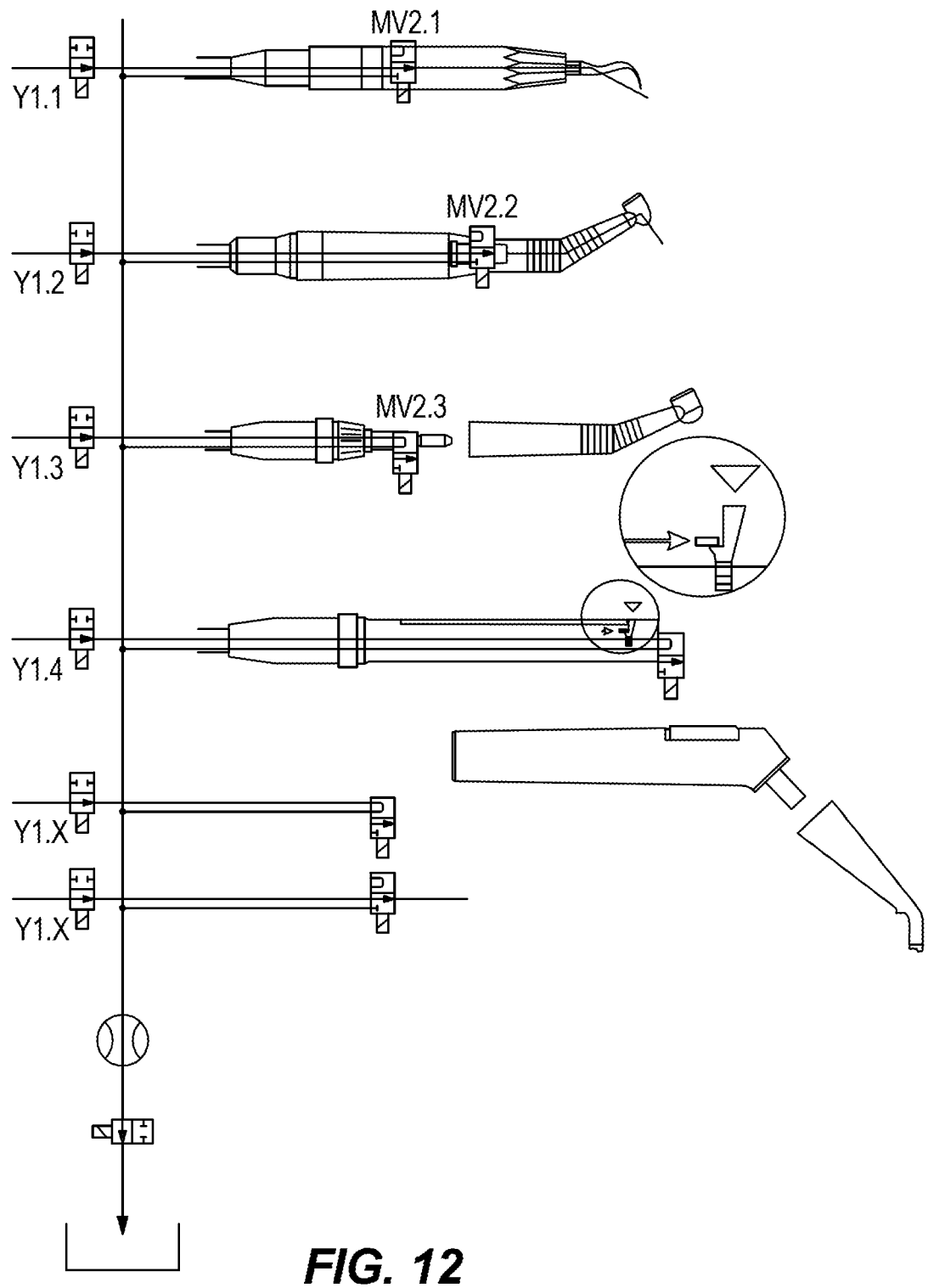
Figure 13:
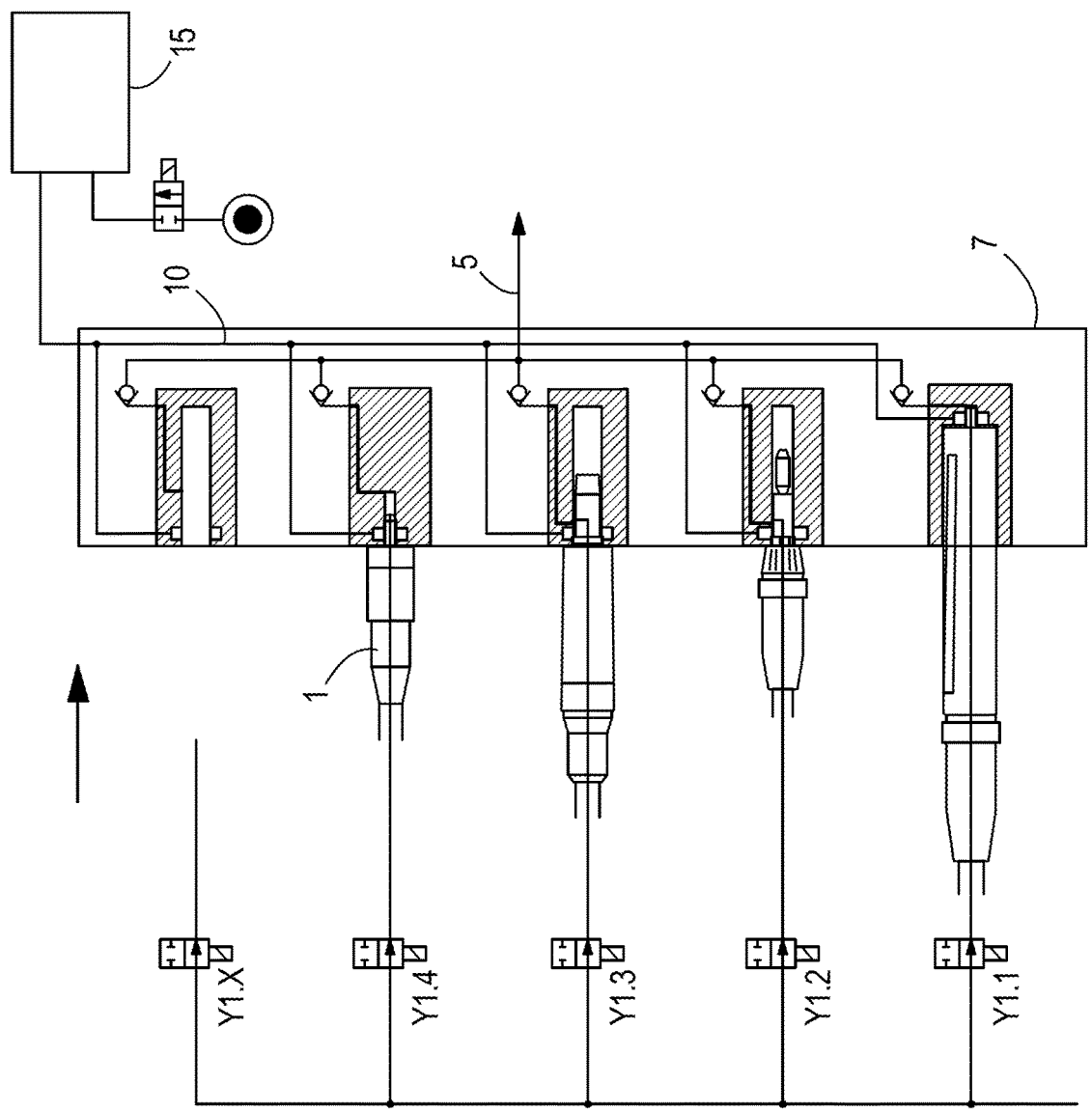
Figure 14:
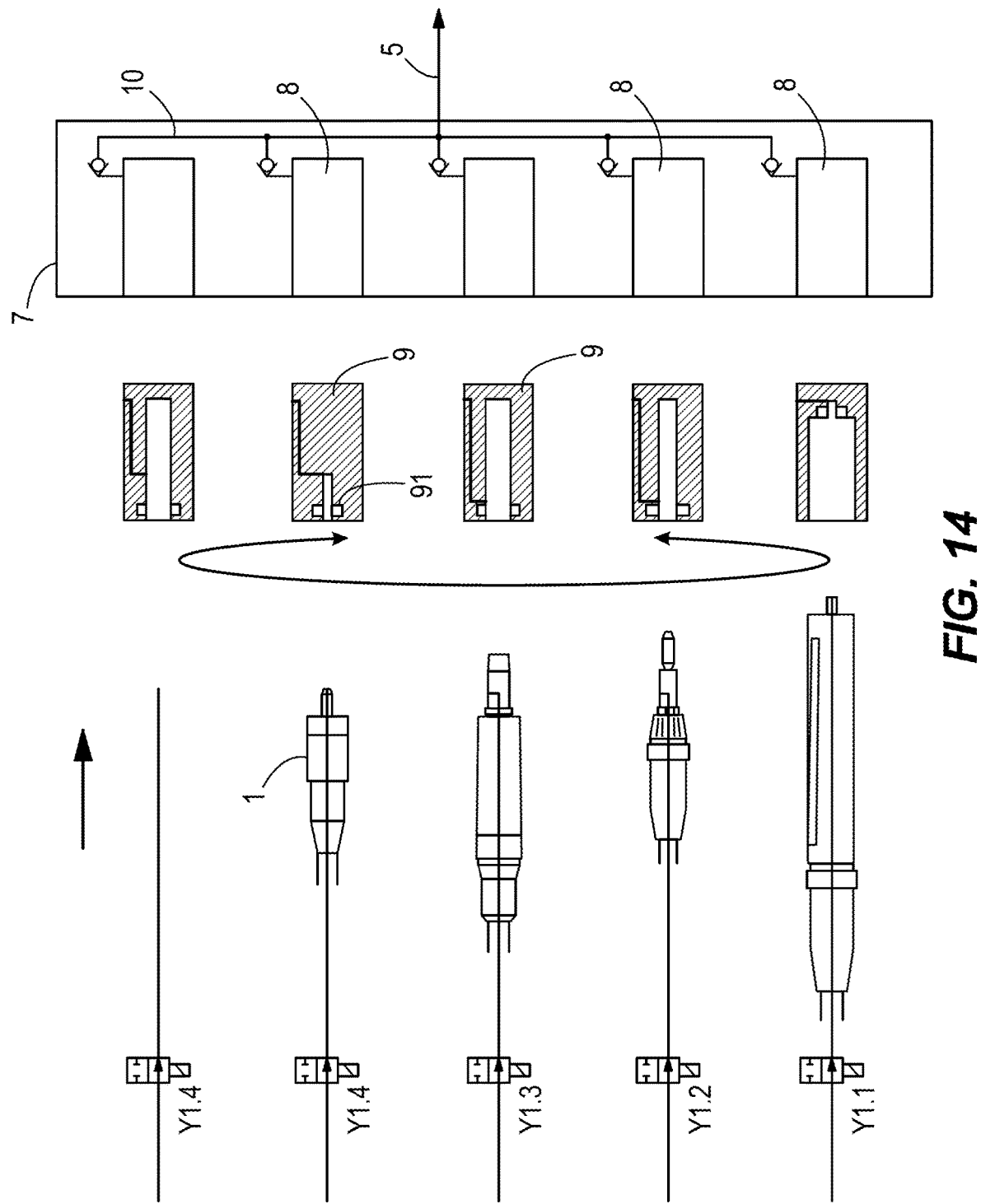
Figure 19:
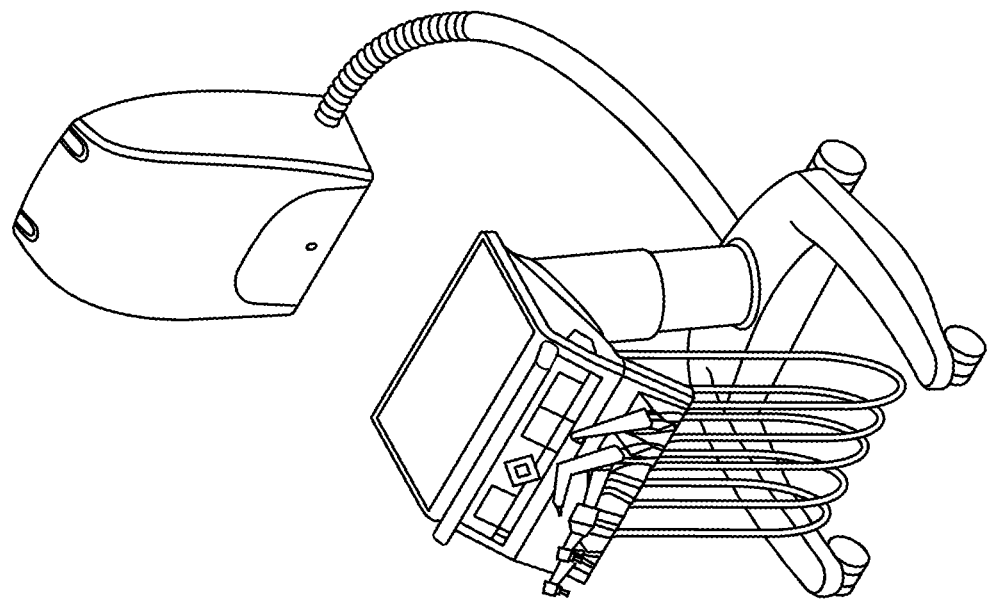

The invention will be more particularly elucidated below on the basis of exemplary embodiments and with regard to the drawings, where:

FIG. 1 shows a sketch relating to a first exemplary embodiment of an assembly according to the invention, wherein the instrument attachments are attached to the coupling units, FIG. 2 show a corresponding sketch, wherein the instrument attachments are withdrawn from the coupling units, FIG. 3 shows a schematic sketch relating to media lines of an assembly, FIG. 4 shows a coupling unit with media lines in a flushing state, FIG. 5 shows the coupling unit in a before-treatment state, FIG. 6 shows the coupling unit during a treatment, FIG. 7 shows a sketch relating to a state of the assembly just before a treatment, FIG. 8 shows a sketch relating to a state of the assembly during the treatment, FIG. 9 shows a sketch relating to a state of the assembly immediately after the treatment, FIG. 10 shows a sketch relating to a state of the assembly after a treatment during a flushing program, FIG. 11 shows a sketch of the assembly with use of check valves, FIG. 12 shows a corresponding sketch of the assembly with use of solenoid valves, FIG. 13 shows a sketch relating to a flushing adapter according to a second exemplary embodiment, FIG. 14 shows a further sketch relating to the flushing adapter, wherein adapter inserts of the flushing adapter are shown in a separated arrangement, FIG. 15 shows a sketch relating to a possible arrangement of the flushing 3o adapter on a dentist's or dental assistant's delivery unit of the assembly, FIG. 16 shows a sketch corresponding to FIG. 15 in the case of an alternative embodiment of the dentist's or dental assistant's delivery unit, FIG. 17 shows a sketch relating to elements of a dental treatment and/or examination assembly, FIG. 18 shows a sketch relating to one variant with a dental assistant's delivery unit, FIG. 19 shows a sketch relating to one variant with a cart version, FIG. 20 shows a sketch relating to a possible configuration of the check valve at the front end region of the coupling unit, and FIG. 21 shows a sketch relating to a further possible configuration of said valve.

FIGS. 1 and 2 show schematic sketches relating to a dental treatment and/or examination assembly—here, assembly for short—according to the invention. Unless otherwise specified here, the assembly can, in particular, be configured in line with the above description with reference to FIGS. 17 to 19.

The assembly thus comprises a dental coupling unit 1 which has a front end region or a front end 11 and a rear end region or a rear end 12. The coupling unit 1 can be releasably coupled or connected at its front end 11 to an instrument attachment 2 for a dental treatment and/or examination. In particular, the coupling unit 1 can, for this purpose, have at its front end 11 a coupling pin, to which the instrument attachment 2 can be attached or fitted. FIG. 1 shows the state when the instrument attachment 2 is fitted, and FIG. 2 shows the state when the instrument attachment 2 is withdrawn.

The instrument attachment 2 can, for example, be a drill handpiece, a scaler or a dental spray handpiece.

For example, the assembly can—in line with the sketch of FIG. 17 or the sketch of FIG. 19—have a dentist's delivery unit 101, on which there is formed a mount, for example in the form of a holder or a stand, for the coupling unit 1. Alternatively, the mount can 3o also be formed on a so-called dental assistant's delivery unit, as shown by way of example in FIG. 18. Hereinafter—for the sake of simpler description—a dentist's delivery unit or dental assistant's delivery unit is to be referred to more generally as "dentist's delivery unit".

Moreover, the assembly comprises a supply unit 3 for providing supply media for the instrument attachment 2, wherein the supply media comprise at least one liquid, especially water. The liquid can, for example, be treated water or a medical or a chemical liquid, for example water to which a sterilization agent has been added.

In a first approximation, the instrument attachment 2 is elongated, meaning that it has a front end 21 and a rear end 22. In particular, the instrument attachment 2 can have a media line 23 which is used to conduct the liquid, wherein the media line 23 of the instrument attachment 2 preferably leads to the outside at the front end 22 of the instrument attachment 2, meaning that the medium can be dispensed in a directed manner onto a task spot in the case of a task with the instrument attachment 2.

At its rear end 12, the coupling unit 1 is connected to a bendable or flexible instrument or supply hose, for example in the form of the hose indicated by the reference sign 105 in FIG. 17. In this connection, the coupling unit 1 can be connected in a releasable manner, especially in reversibly releasable manner, or in a permanent manner to the supply hose 105. On the other hand, the supply hose 105 can be connected to the dentist's delivery unit 101, on which there is formed the mount for the coupling unit 1. The supply hose can, for example, extend through the swivel-rod assembly 107 shown in FIG. 17.

Extending through the supply hose 105 is a media delivery line 4, which extends from the supply unit 3 through the coupling unit 1 toward the instrument attachment 2 or up to the front end 11 of the coupling unit 1. That segment of the media delivery line 4 which extends from the rear end 12 of the coupling unit 1 as far as the front end 11 of the coupling unit 1 can be a component of the coupling unit 1. The media delivery line 4 is used to deliver the liquid to the instrument attachment 2, especially into the media line 23 of the instrument attachment 2.

Moreover, the assembly comprises a media return line 5 which is connected to an end region of the media delivery line 4, said end region facing the instrument attachment 2. In this connection, the assembly moreover has means for selectively enabling a flow of the liquid through the media delivery line 4 and the media return line 5.

Preferably, the media return line 5 also extends through the supply hose 105. The media return line 5 can extend at least in part through the coupling unit 1. In particular, the coupling unit 1 can thus be releasably or permanently connected to the supply unit 3 via the supply hose 105.

That segment of the media return line 5 which extends from the front end 11 of the coupling unit 1 as far as the rear end 12 of the coupling unit 1 can be a component of the coupling unit 1.

The coupling unit 1 preferably has a valve arrangement 6 which blocks an escape of the liquid from the coupling unit 1 when the instrument attachment 2 is not fitted to the coupling unit 1.

Preferably, the means for selective enabling comprise a valve Y2, which is arranged in the region of the media return line 5.

Further preferably, the configuration is such that the media delivery line 4 is automatically connected in a liquid-conducting manner to the media line 23 of the instrument attachment 2 when the instrument attachment 2 is, as intended, connected to the coupling unit 1. In this way, there is, for the instrument attachment 4, virtually automatically an operational-ready state for a task, when the instrument attachment 2 is connected to the coupling unit 1.

Further preferably, the configuration is such that the media delivery line 4 is automatically not connected in a liquid-conducting manner to the media line 23 of the instrument attachment 2 when the instrument attachment 2 is, as intended, not connected to the coupling unit 1, i.e., is separated from the coupling unit 1, especially by means of the valve arrangement 6. In this way, it is possible in particular to prevent liquid in the region of the coupling unit 1 from escaping outwardly or to the outside when the instrument attachment 2 is not attached.

In this way, what can be achieved is that an attachment of the instrument attachment 2 readily brings the latter to an operational-ready state. After a task has been completed, i.e., after the treatment of a patient for example, the instrument attachment 2 is usually withdrawn from the coupling unit 1 for hygienic processing thereof; as a result of the described configuration, the assembly is then readily in a state in which the media delivery line 4—from the supply unit 3 as far as the interface between the coupling 3o unit 1 and the instrument attachment 2—can be flushed without the liquid escaping in this case at the front end 11 of the coupling unit 1. In this connection, the coupling unit 1 can advantageously remain in its mount on the dentist's delivery unit 101.

Preferably, the supply unit 3 is designed to flush the media delivery line 4 and the media return line 5 with the liquid. The configuration can thus, in particular, be such that, after the instrument attachment 2 has been withdrawn from the coupling unit 1, liquid is driven through the media delivery line 4, with the result that the latter is flushed through, triggered especially by the means for selectively enabling the flow of the liquid. In particular, what can be provided is that a corresponding flushing program is started for this purpose, especially by opening the valve Y2. For example, the assembly can have a pressure sensor, a camera, a scanner or an alternative means of patient identification, by means of which the flushing program is automatically started. This is also advantageous with regard to the option of documentation or quality assurance. Alternatively, the configuration can, for example, also be such that the flushing program is started when the patient chair 103 of the assembly is brought to a step-off position after the treatment.

In this connection, the configuration is, further preferably, such that the supply unit 3 dispenses the flushing liquid for a predefined period of time or dispenses a predefined quantity of the liquid. Thus, what can be achieved is that the flushing is "automatically" carried out with a certain desired quality. This is especially advantageous with regard to quality assurance or quality management.

Further preferably, the configuration is, in this connection, also such that the supply unit 3 monitors the quantity of the liquid dispensed for flushing. For this purpose, a volume flow meter, for example in the form of a flow sensor or flow sensor device 51, can be provided in or on the media return line 5. This, too, is particularly advantageous with regard to quality assurance.

Preferably, the media return line 5 extends as a pressure line as far as the supply unit 3 or a disposal point 31 for the disposal of the liquid.

As a result of the described configuration, what can thus also be achieved is that no separate flushing device is required, this being especially advantageous for space reasons.

Moreover, it is possible to achieve a "workflow optimization", since the actions—i.e., 3o the plugging of the supply hoses in question into corresponding adapters for example—which hitherto had to be carried out by practice staff for flushing are now no longer necessary.

Self-evidently, the assembly—as sketched by way of example in FIGS. 17 to 19 and also in FIGS. 1 and 2 as such—can comprise multiple corresponding coupling units and multiple corresponding instrument attachments, it being possible for the instrument attachments to fundamentally differ. In this connection, the configuration can be such that the coupling unit 1 can be connected as desired to one of the multiple different instrument attachments.

Especially in this case, the configuration is, further particularly preferably, such that the supply unit 3 is capable of recognizing the type of fitted instrument, i.e., of fitted instrument attachment 2. In particular, the supply unit 3 can, for this purpose, be connected to a recognition device for recognizing a type of instrument attachment 2 or configured therefor.

With the described assembly, it is thus possible in particular to carry out a method for flushing the liquid-conducting system of the assembly, wherein the end region of the media delivery line 4 is connected to the media return line 5, which end region faces the instrument attachment 2, and the liquid is flushed through the media delivery line 4 and through the media return line 5 connected thereto, when the instrument attachment 2 is not fitted to the coupling unit 1 or is not connected, as intended, to the coupling unit 1.

In this connection, the flushing of the liquid preferably takes place automatically after the instrument attachment 2 has been removed or separated from the coupling unit, i.e., after the instrument attachment 2 has been withdrawn from the coupling pin of the coupling unit 1 for example.

FIG. 3 shows a schematic sketch relating to a possible configuration of media lines of the assembly. Accordingly, the assembly can have a domestic water connection for drinking water 300, a "water connection and filtration" unit 301, a "water block with free outlet" unit 302, a "sterilization agent" unit 303, an outflow 304, a pan 305 and a tumbler 306. In this connection, the media delivery line 4 extends from the "water block with free outlet" unit 302 as far as into the coupling unit 1. In this connection, the "water block with free outlet" unit 302 can, in particular, be part of the 3o abovementioned supply unit 3.

FIGS. 4, 5 and 6 show—using the example of an instrument attachment 2' in the form of a turbine—sketches relating to different states of the assembly with a possible configuration of valves.

What can be provided in the media delivery line 4 is a valve Y 1.0, which is connected to a control-air line 400, to which, for example, compressed air can be applied using a foot control (not shown in the figures). In this connection, what can be provided in particular is that, upon an actuation of the foot control, compressed air is applied to the control-air line and the valve Y 1.0 opens as a consequence; ending the actuation of the foot control then accordingly closes the valve Y 1.0.

Moreover, what can be provided in the media delivery line 4 is a valve Y 1.3, which, for example, is closed by deposition of the coupling unit 1 in the mount on the dentist's delivery unit 101, which mount is intended for this purpose, and is opened by removal from the mount.

Moreover, what can be provided in the media delivery line 4 within the coupling unit 1 is a check valve RSV 3.3, which opens when pressure is or has been applied on the part of the supply unit 3 to the liquid in the media delivery line 4—when valves Y 1.0 and Y 1.3 are opened.

Moreover, what can be provided on the front end 11 of the coupling unit 1 is a check valve RSV 2.3, which is arranged in an operative manner between the media delivery line 4 and the media line 23' of the instrument attachment 2' and which is opened when the instrument attachment 2' is attached on the coupling unit 1 and which is closed when the instrument attachment 2' is removed or separated from the coupling unit 1. When the check valve RSV 2.3 is opened, the liquid can—as shown in FIG. 6—flow from the media delivery line 4 into the corresponding media line 23' of the instrument attachment 2'. For example, what can be provided is a mechanically operative mechanism which automatically opens the check valve RSV 2.3 when the instrument attachment 2' is attached onto the coupling unit 1 and which automatically closes the check valve RSV 2.3 when the instrument attachment 2' is withdrawn from the coupling unit 1. In this connection, the mechanically operative mechanism can, in particular, be formed on the part of the coupling unit 1 and/or on the part of the instrument attachment 2'.

In terms of its function, the check valve RSV 2.3 corresponds to the valve arrangement identified by the reference sign 6 in FIGS. 1 and 2.

FIG. 20 shows a sketch of a possible configuration of the check valve RSV 2.3 or of the valve 6. In this connection, the sketch shows a region of the front end 11 of the coupling unit 1 or of the coupling pin, specifically when the instrument attachment 2 is not attached. According to this embodiment, the check valve 6 has a chamber 1005, which is connected in a conducting manner to the media delivery line 4 on the one hand and to the media return line 5 on the other. Arranged in the chamber 1005 is a ball 1000, which is pressed by a spring 1001 against an O-ring 1002, which—when the instrument attachment 2 is not attached—seals the exit of the chamber 1005 or of the check valve 6. This state is thus present when flushing for example, with the result that, in this case, the liquid flows through the media delivery line 4 into the chamber 1005 and then subsequently leaves the chamber 1005 merely by entry into the media return line 5.

Moreover, the valve 6 comprises a, for example, curved spring wire 1003 which is connected to a plunger 1004. In this connection, the configuration is such that, when the instrument attachment 2 is attached onto the front end 11 of the coupling unit 1 or onto the coupling pin, the plunger 1004 is pressed inward with regard to the chamber 1005 by the wire spring 1003, with the result that a gap arises between the ball 1000 and the O-ring 1002 and the media line 23 of the instrument attachment 2 is thus connected in a conducting manner to the chamber 1005. In this state, the path for the liquid from the chamber 1005 into the instrument attachment 2 or into its media line 23 is therefore free.

FIG. 21 shows a further possible configuration of the valve 6, wherein the reference signs are used in an analogous manner. In this configuration, what is arranged in the chamber 1005 is a taper 1006 which—when the instrument attachment 2 is not attached—is pressed against the O-ring 1002 via a spring 1001'. The taper 1006 is connected to a rounded head 1007 which is moved inward when the instrument attachment 2 is attached, with the result that the taper 1006 disengages from the O-ring 1002 and the path for the liquid into the instrument attachment 2 is in turn thus open. In this connection, a cylindrical pin 1001' is preferably used to guide the taper 1006.

Moreover, what can, for example, likewise be provided in the coupling unit 1 is a check valve RSV 1.3 in the media return line 5, the function of which will be addressed further below.

Moreover, the valve Y2 can be provided in the media return line 5 between the check valve RSV 1.3 and the disposal point 31.

FIG. 4 shows a sketch of a flushing state. In this configuration, the valves Y 1.0 and Y 1.3 are opened in the flushing state. Accordingly, pressure is applied on the part of the supply unit 3 to the media delivery line 4 and the check valve RSV 3.3 is consequently also opened. The check valve RSV 2.3 is closed, since the instrument attachment 2' is separated from the coupling unit 1. The valve Y2 is likewise opened and consequently, due to pressure, the check valve RSV 1.3 as well.

FIG. 5 shows a sketch of a standby state, in which the instrument attachment 2' is provided for a task. Here, the instrument attachment 2' is already attached on the coupling unit 1, meaning that that the check valve RSV 2.3 is consequently opened. The coupling unit 1 is still situated in the mount and the valve Y 1.3 is accordingly closed. In addition, the foot control has not yet been actuated, meaning that the valve Y 1.0 is also still closed. The valve Y2 is closed and the check valve RSV 1.3 is accordingly also closed.

FIG. 6 shows a sketch of a working state. The instrument attachment 2' is taken out of its mount, meaning that the valve Y 1.3 is opened; the foot control is actuated, meaning that the valve Y 1.0 is opened. The valve Y2 is closed and consequently the check valve RSV 1.3 as well. The check valve RSV 2.3 is opened, since the instrument attachment 2' is attached on the coupling unit 1. Here, the liquid is accordingly driven from the supply unit 3 through the media delivery line 4 into the media line 23' of the instrument attachment 2'.

FIGS. 7 to 10 show, exemplarily, sketches relating to possible different states of the assembly with multiple coupling units and multiple instrument attachments, depicted one under another here.

FIG. 7 shows a sketch of a state in which the instrument attachments are in the standby state. In this connection, the instrument attachments are each attached on a coupling unit and are situated in their respective corresponding mounts on the dentist's delivery unit 101. In this connection, the unit situated at the third spot from the top, comprising the coupling arrangement 1 and the instrument attachment 2', corresponds to the unit shown in FIGS. 4 to 6.

The units sketched at the first and the second spot from the top are, with regard to their valve arrangements, configured analogously to the unit shown at the third spot. Accordingly, what are thus formed are valves Y 1.1 and Y 1.2, corresponding to the valve 1.3 in terms of their function, check valves RSV 3.1 and RSV 3.2, corresponding to the check valve RSV 3.3 in terms of their function, and check valves RSV 2.1 and RSV 2.2, corresponding to the check valve RSV 2.3 in terms of their function. The valve Y 1.0 is, as shown, connected to the valves Y 1.1, Y 1.2 and Y 1.3.

In this connection, the top three units, i.e., the top three coupling units with the attached instrument attachments, are in a state as described in principle above on the basis of FIG. 5. Situated at the fourth and the fifth position from the top is, in both cases, a coupling unit with an instrument attachment in the form of a sprayer. In this connection, the corresponding media delivery lines of the two sprayers are connected via a valve Y 1.4 to the supply unit 3, which is in the opened position in the state shown. As shown by the enlargement in a circle, the sprayers have a button 700 with a catch, the actuation of which can open or close the media delivery line in question. The sprayers also have check valves RSV 1.4 and RSV 1.5, corresponding to the check valve RSV 1.3 in terms of their function.

The valve Y2 is closed and the valves RSV 1.3, RSV 1.4 and RSV 1.5 are consequently likewise closed. The same applies to the other corresponding check valves RSV 1.1 and RSV 1.2 of the top two coupling units; worded more generally, the check valves "RSV 1.X", where X=1 . . . 5, are closed.

FIG. 8 shows a sketch of a state during a treatment, in which state the instrument attachments required for the treatment are attached. The coupling unit sketched at the top spot is removed from its mount, meaning that the corresponding valve Y 1.1 is opened. The coupling units at the second and the third spot from the top are situated in their mounts, meaning that the valves Y 1.2 and Y 1.3 are closed.

In this connection, in the unit sketched at the top spot, the valve RSV 1.1—corresponding in terms of its function to the valve indicated by the reference sign RSV 1.3 in FIG. 4 and to the valve indicated by the reference sign 6' in FIGS. 1 and 2—is closed, because the valve Y2 is closed. In this way, what can be prevented with certainty, when flushing a coupling unit or when using a coupling unit provided with an instrument attachment, is the liquid escaping at another coupling unit to which an instrument attachment is attached, as sketched exemplarily at the second spot from the top in FIG. 8.

The sequence for preparation and when starting a task or treatment with regard to the instrument attachment shown at the top spot—here in the form of a scaler—is:
1) Attachment of the instrument attachment onto the coupling unit in question opens the check valve RSV 2.1.
2) When the coupling unit is taken out of its mount, the valve Y 1.1 opens.
3) When the foot control is actuated, the valve Y 1.0 opens.
4) The check valve RSV 3.1 opens consequently due to pressure.

The check valves RSV 1.1 to RSV 1.5, or RSV 1.X, are closed, since the valve Y2 is not opened.

FIG. 9 shows a sketch of a state immediately after the treatment, in which state the instrument attachments in question are still attached on their coupling units, but all coupling units are situated in their mounts.

The sequence when ending the treatment with regard to the instrument attachment shown at the top spot is:
1) Releasing the foot control closes the valve Y 1.0.
2) The piston of the valve Y 1.0 builds up a negative pressure.
3) The check valve RSV 3.1 consequently closes.
4) Deposition of the coupling unit into the mount in question closes the valve Y 1.1.

The check valves RSV 1.1 to RSV 1.5, or RSV 1.X, are still closed, since the valve Y2 is still not opened.

FIG. 10 shows a state in which the media delivery line in relation to the coupling unit shown at the top spot is flushed through with the liquid. For the top unit, the state thus corresponds to the state shown in FIG. 4.

The sequence when flushing with regard to the instrument attachment shown at the top spot is:
1) Removal of the instrument attachment from the coupling unit closes the check valve RSV 2.1.
2) The valve Y 2 is opened, the result being that the check valve RSV 1.1 is consequently also opened.

The valves Y 1.1 and Y 1.0 are opened.

Over the course of the flushing program, the valves Y 1.1 to Y 1.3, or Y 1.X, can be switched through in sequence, meaning that the media delivery lines in question are flushed through successively. To flush the media delivery lines of the sprayers, the valve Y 1.0 is closed and the valve Y 1.4 is opened.

FIG. 11 shows a sketch of the assembly in which, with regard to the top unit, the above-described check valves RSV 1.1 and RSV 2.1 are provided. As sketched in FIG. 12, it is, however, alternatively also possible to provide a correspondingly configured solenoid valve MV 2.1 instead of these two check valves. Self-evidently, the same applies to the other units.

FIGS. 13 to 16 show two sketches relating to a second exemplary embodiment. The reference signs are used in the same way as above. Unless otherwise described in the following, the above remarks apply correspondingly or analogously to the second exemplary embodiment as well.

In the second exemplary embodiment, what is provided is a flushing adapter 7 which can be connected or coupled to the coupling unit 1 when the instrument attachment 2 is not fitted or attached. In this connection, the media return line 5 extends starting from the flushing adapter 7; in this connection, the media delivery line 4 extending through the coupling unit 1 is connected in a conducting manner to the media return line 5 for the liquid when the coupling unit 1 is coupled to the flushing adapter 7. Preferably, the media return line 5 also extends through the swivel-rod assembly 107 of the assembly in this embodiment.

In this configuration, the instrument attachment 2 is thus withdrawn after the treatment has ended, and the coupling unit 1 is then, as intended, connected to the flushing adapter 7, i.e., coupled to the flushing adapter 7.

In this connection, the flushing adapter 7 is preferably—as sketched in FIG. 15—arranged on the dentist's delivery unit 101 of the assembly. FIG. 16 shows a corresponding configuration in the case of an alternatively formed dentist's delivery unit 101", in which the supply hoses—as known in this respect—are arranged, starting from the coupling unit, so as to lead upward instead of downward. As a result of the arrangement of the flushing adapter 7 on the dentist's delivery unit 101 or 101", what can be achieved is that the coupling unit 1 is situated particularly close to the flushing adapter 7, the result being that, owing to the swivel-mounted arrangement of the dentist's or dental assistant's delivery unit 101, 101", a particularly simple and ergonomically advantageous handling when coupling the coupling unit 1 to the flushing adapter 7 is made possible.

In this connection, the assembly can comprise, in particular, multiple corresponding, though different, coupling units and multiple corresponding, though different, instrument attachments, as indicated as such in FIG. 2 for example, wherein only some of the instrument attachments can be coupled or connected to some of the coupling units. Accordingly, in this case, the assembly preferably also has multiple supply hoses, wherein each of the supply hoses is respectively connected to one of the coupling units. On the other hand, the supply hoses are connected to the dentist's delivery unit 101. At the same time, multiple corresponding mounts for the coupling units are formed on the dentist's delivery unit 101, specifically one mount for each coupling unit.

Especially in this case, the flushing adapter 7—as sketched in FIGS. 13 and 14—preferably has multiple seats 8 for adapter inserts 9 which are each designed for coupling to one of the multiple different coupling units. What can thus be provided are different adapter inserts 9, wherein each of the adapter inserts 9 is formed in a corresponding or matching manner in relation to at least one of the different coupling units.

In this connection, the configuration is preferably such that the adapter inserts 9—as symbolized by a curved double arrow in FIG. 14—can be freely positioned in the seats 8, i.e., such that each of the adapter inserts 9 can be inserted in a matching manner into each of the seats 8. What can thus be achieved is that the adapter inserts 9 within the flushing adapter 7 can be placed particularly close to the mounts of the respectively corresponding coupling units. In particular, what can thus also be achieved is that, when handling the flushing adapter 7, an entanglement of the supply hoses can be easily prevented.

As a result of this configuration, an unambiguous assignment of the coupling units to the respective adapter inserts 9 is made possible so to speak. During handling, only short paths are required. All of this is advantageous with regard to the "workflow".

As indicated in FIG. 14, the flushing adapter 7 can have an O-ring treatment and disinfection liner 91, which is used to treat or disinfect an O-ring of the coupling unit 1. The O-ring treatment and disinfection liner 91 can, in particular, be appropriately formed in the adapter insert 9 in question or in several or all of the adapter inserts 9. In this connection, the configuration is such that the O-ring in question can be treated or disinfected after the coupling unit 1 has been inserted into the adapter insert 9.

Further preferably, the flushing adapter 7 also has a feed line 10 for a treatment agent, cleaning agent or disinfecting agent. In the example shown, the feed line 10 is connected to a container 15 for the treatment agent, cleaning agent or disinfecting agent. In particular, the feed line 10 can be configured for the feeding of the treatment agent, cleaning agent or disinfecting agent to the O-ring treatment and disinfection liner 91.

The invention claimed is:

1. A dental coupling unit which can be releasably coupled at a front end to an instrument attachment for dental treatment and/or examination and which can moreover be connected at a rear end to a supply unit for providing supply media for the instrument attachment, wherein the supply media comprise a liquid,
    wherein a media delivery line for the liquid extends through the coupling unit from the rear end to the front end to deliver the liquid in a first direction, and
    wherein additionally a media return line extends through the coupling unit in a direction opposite to that of the media delivery line to move the at least one liquid in a second, opposite direction away from the front end of the dental coupling unit and to the rear end of the dental coupling unit, which media return line is connected to an end region of the media delivery line extending through the coupling unit, said end region facing the instrument attachment, wherein the coupling unit has a valve arrangement which conducts the liquid from the coupling unit to the instrument attachment when the instrument attachment is fitted to the front end of the dental coupling unit and conducts the liquid to the media return line and blocks an escape of the liquid at the front end of the coupling unit when the instrument attachment is not fitted.

2. The dental coupling unit as claimed in claim 1, further comprising the liquid provided by the supply unit, wherein the liquid is water, treated water or medical or chemical liquid.

3. A dental treatment and/or examination assembly having a dental coupling unit as claimed in claim 1, and the supply unit, wherein the media delivery line extends from the supply unit through the coupling unit toward the instrument attachment, wherein the dental treatment and/or examination assembly moreover has means for selectively enabling a flow of the liquid through the media delivery line and the media return line, wherein these means for selective enabling comprise the valve arrangement.

4. The dental treatment and/or examination assembly as claimed in claim 3, wherein the means for selective enabling moreover comprise a valve (Y2), which is arranged in the region of the media return line.

5. The dental instrument and/or examination assembly as claimed in claim 3, wherein the supply unit is designed to flush the media delivery line and the media return line with the liquid, wherein the supply unit dispenses the flushing liquid for a predefined period of time or dispenses a predefined quantity of the liquid.

6. The dental instrument and/or examination assembly as claimed in claim 3, wherein the media return line extends as a pressure line as far as the supply unit or a disposal point.

7. The dental coupling unit as claimed in claim 1, wherein the valve arrangement includes a chamber fluidly coupled to both the media delivery line and the media return line.

8. The dental coupling unit as claimed in claim 7, further comprising a movable valve element configured to control a flow of the fluid within the chamber.

9. The dental coupling unit as claimed in claim 8, wherein the movable valve element is a ball is arranged within the chamber, wherein the ball is biased by a spring element.

10. The dental coupling unit as claimed in claim 9, wherein the ball is configured to be biased by the spring element to seal an exit of the chamber when the instrument attachment is not coupled to the dental coupling unit, so as to cause the liquid to flow through the medial delivery line, into the chamber, and then subsequently into the media return line.

11. The dental coupling unit as claimed in claim 9, further comprising an O-ring, a plunger, and a curved spring wire coupled to the plunger, wherein when the instrument attachment is coupled to the dental coupling unit the plunger is configured to be pressed inward into the chamber, and a gap is configured to form between the ball and the O-ring to allow the liquid to move from the chamber to the instrument attachment.

12. The dental coupling unit as claimed in claim 8, wherein the movable valve element is a tapered element arranged within the chamber, and is biased by a spring.

13. The dental coupling unit as claimed in claim 12, further comprising an O-ring, wherein the tapered element is biased toward the O-ring.

14. The dental coupling unit as claimed in claim 12, wherein the tapered element is coupled to a rounded head, wherein the rounded head is configured to move inward into the chamber when the instrument attachment is coupled to the dental coupling unit, to allow the liquid to move from the chamber to the instrument attachment.

15. The dental coupling unit as claimed in claim 14, further comprising a cylindrical pin configured to guide the movement of the tapered element.

16. A dental system comprising:
the dental coupling unit as claimed in claim 1, and the instrument attachment configured to be releasably coupled to the dental coupling unit.

17. The dental system as claimed in claim 16, wherein the instrument attachment is one of a dental handpiece, a contra-angle handpiece, a turbine, or a scaler.

18. A method for flushing the liquid-conducting system of a dental treatment and/or examination assembly, wherein the treatment and/or examination assembly has:
a dental coupling unit having a rear end and a front end, wherein the dental coupling unit can be releasably coupled at its front end to an instrument attachment for dental treatment and/or examination,
a supply unit for providing supply media for the instrument attachment, wherein the supply media comprise a liquid,
a media delivery line for the_liquid, which extends from the supply unit to the rear end of the coupling unit and through the coupling unit toward the front end of the coupling unit, and
a media return line extending through the coupling unit in a direction opposite to that of the media delivery line;
said method having the steps of:
a) conducting the liquid from the coupling unit to the instrument attachment in a first direction through the media delivery line when the instrument attachment is fitted to the coupling unit,
b) flushing the liquid through the media delivery line and through the media return line connected to the latter when the instrument attachment is not fitted to the coupling unit.

19. The method as claimed in claim 18, wherein the media return line extends as a pressure line starting from a flushing adapter to which the coupling unit is connected in step b).

20. The method as claimed in claim 18, moreover having the step of c) opening a valve arrangement of the coupling unit by fitting the instrument attachment to the coupling unit, wherein the media delivery line is connected in a conducting manner to a media line of the instrument attachment when the valve arrangement is opened.

21. The method as claimed in claim 20, moreover having the step of d) closing the valve arrangement by withdrawing the instrument attachment from the coupling unit, wherein an escape of the liquid at the front end of the coupling unit is blocked when the valve arrangement is closed.

22. The method as claimed in claim 18, moreover having the step of e) applying an overpressure to the media delivery line, wherein a check valve arranged in the media return line is opened by the applied overpressure.

23. A dental treatment and/or examination assembly comprising:
a dental coupling unit which can be releasably coupled at a front end to an instrument attachment for dental treatment and/or examination and which can moreover be connected to a supply unit for providing a liquid for the instrument attachment, wherein a media delivery line for the liquid extends through the coupling unit toward the instrument attachment, and wherein additionally a media return line extends through the coupling unit, which media return line is connected to an end region of the media delivery line extending through the coupling unit, said end region facing the instrument attachment, wherein the coupling unit has a first valve which conducts the liquid from the media delivery line in the coupling unit to the instrument attachment when the instrument attachment is fitted to the front end of the dental coupling unit and conducts the liquid to the media return line and blocks an escape of the liquid at the front end of the coupling unit when the instrument attachment is not fitted to the front end of the dental coupling unit;

wherein the media return line includes a second valve configured to control a flow of the liquid through the media return line; and wherein the first valve is configured to be closed and the second valve is configured to be opened to flush the liquid from the dental coupling unit when the instrument attachment is not fitted to the front end of the dental coupling unit.

* * * * *